United States Patent [19]
Green et al.

[11] Patent Number: 5,733,431
[45] Date of Patent: Mar. 31, 1998

[54] METHOD FOR REMOVING COPPER IONS FROM COPPER ORE USING ORGANIC EXTRACTIONS

[75] Inventors: Dennis H. Green, Arvada; Jeffrey J. Mueller, Boulder, both of Colo.

[73] Assignee: HW Process Technologies, Inc., Lakewood, Colo.

[21] Appl. No.: 699,616

[22] Filed: Aug. 21, 1996

[51] Int. Cl.$^6$ .................................................. C25C 1/12
[52] U.S. Cl. .................................................. 205/581
[58] Field of Search .................................................. 205/581

[56] References Cited

U.S. PATENT DOCUMENTS

| | | | |
|---|---|---|---|
| 3,697,400 | 10/1972 | Pang | 205/581 |
| 4,016,056 | 4/1977 | DeMarthe et al. | 205/581 |
| 4,083,758 | 4/1978 | Hamby et al. | 205/581 |
| 4,269,676 | 5/1981 | Libús et al. | 205/581 |
| 4,594,132 | 6/1986 | Satchell, Jr. et al. | 205/581 |
| 4,944,882 | 7/1990 | Ray et al. | |
| 4,981,594 | 1/1991 | Jones | |
| 5,166,123 | 11/1992 | Agui et al. | |
| 5,310,486 | 5/1994 | Green et al. | |
| 5,476,591 | 12/1995 | Green | |

OTHER PUBLICATIONS

Arbiter, N., et al., "Copper Hydrometallurgy—Evolution and Milestone", *Mining Engineering*, Feb. 1984 (pp. 118-123).
Krishman, E. R. et al., *Recovery of Metals from Sludges and Wastewaters*, Noyes Data Corporation, New Jersey, pp. 38-46 (1993) No Month.
Lynch, A.J., et al., "Solvent Extraction Boom in Latin America", *Engineering and Mining Journal*, Dec. 1994 (pp. 18-21).
Kordosky, G., et al., "Pilot Plant Studies on the Relationship Between Copper Solvent Extraction Reagents and Crud Formation", Preprint N. 96-35 by the Society for Mining, Metallurgy, and Exploration, Inc. (presented at the SME Annual Meeting in Phoenix, AZ (USA) on Mar. 11-14, 1996).
Townson, B., et al., "The Solvent Extraction of Copper—A Perspective", *Mining Magazine*, 126(1): 26-35 (Jan. 1990).
Gonzales, I., et al., "Toquepala-Cuajone Leach—Solvent Extraction—Electrowinning Project", paper presented at the S.M.E. (Society of Mining Engineers) Annual Meeting at Phoenix, AZ (USA), Mar. 11-14, 1996, pp. 1-10 (Preprint No. 96-206).
Data Sheet from Henkel Co. re LIX® 622N extractant No Month (1993).
Data Sheet from Henkel Co. re LIX® 984N extractant No Month (1993).
Hall, S., "Cross Contamination of ODC Solvent Extraction Circuits", Preprint N. 96-162 by the Society for Mining, Metallurgy & Exploration, Inc. (presented at SME Annual Meeting in Phoenix, Az (USA) on Mar. 11-14, 1996).
Brochure by BHP copper entitled "From Rock to Rod" (undated) No Date.
Brochure by Magma Copper Company involving Copper processing (undated) No Date Available No Date.
Kemmer, F. (ed), *The Nalco Water Handbook*, 2nd ed., McGraw Hill, (N.Y.), pp. 15.1-15.4 No Date Available No Date.

*Primary Examiner*—Donald R. Valentine
*Attorney, Agent, or Firm*—Klaas, Law, O'Meara & Malkin, P.C.; Jay K. Malkin

[57] ABSTRACT

A method for removing solid wastes from an organic extractant-based SX/EW copper processing system. A lixivant is initially applied to copper ore, followed by mixing of the copper-containing lixivant product with an organic extractant. The organic extractant (which contains extracted copper ions) is then contacted with an electrolyte solution. At least part of the remaining organic fraction after electrolyte contact is passed through a filtration membrane (either an ultrafiltration or microfiltration membrane) to remove solid wastes. The filtered organic fraction is then reused within the system, followed by electrowinning of the copper-containing electrolyte to recover purified copper. Alternatively, the organic extractant may be membrane-filtered after initial contact with the copper-containing lixivant product to remove solid wastes from the organic extractant. Both embodiments improve phase separation efficiency, reduce organic extractant losses, and improve the effectiveness of the electrowinning process.

19 Claims, 4 Drawing Sheets

METHOD FOR REMOVING COPPER IONS FROM COPPER ORE USING ORGANIC EXTRACTIONS

BACKGROUND OF THE INVENTION

The present invention generally relates to the removal of copper ions from copper ore, and more particularly to a multi-phase copper ion removal method using organic extractants in which the extractants are purified during use. This process improves the level of extractant efficiency and operating capabilities of the system.

The overall efficiency of a copper mining operation depends on the techniques which are used to remove copper from raw ore. Many different methods have been developed over time to accomplish copper removal with a maximum degree of effectiveness. Of primary interest are various techniques which are collectively known as "copper hydrometallurgy" in which copper ions are leached or otherwise extracted from raw ore using chemical agents. According to Arbiter, N., et al., "Copper Hydrometallurgy—Evolution and Milestones", Mining Engineering, Febuary 1984 (pp. 118–123) which is incorporated herein by reference, copper hydrometallurgy techniques have been of interest since as early as the 17th century when copper recovery methods involving iron precipitating agents were tested. Other removal agents were tested and analyzed in later years, including $H_2S$ (hydrogen sulfide) which was used to precipitate CuS (copper sulfide) from copper ore in the late 1800s and early 1900s.

During the early 20th century, further developments were made in copper extraction technology. For example, ammonia and ferric sulfate leaching processes were tested extensively during the 1930s in combination with a further procedure known as "electrowinning". Electrowinning basically involves a process in which a metal ion-containing solution is placed in contact with at least one cathode and anode, followed by the application of electricity to the solution. As a result, metal (e.g. copper) ions within the solution are plated onto the cathode and thereafter removed in elemental form. Electrowinning as an electrochemical recovery process is known in the art and discussed in a number of literature references, including Krishman, E. R. et al., Recovery of Metals from Sludges and Wastewaters, Noyes Data Corporation, New Jersey, pp. 38–46 (1993) which is likewise incorporated herein by reference.

In the 1950s and 1960s, a different type of extractant was developed which offered considerable promise in copper recovery processes. As discussed in "Solvent Extraction Boom in Latin America", Engineering and Mining Journal, December 1994 (pp. 18–21) which is also incorporated herein by reference, organic solvent materials (hereinafter "organic extractants") were produced and successfully tested. These materials enabled the efficient extraction of copper ions in a multi-stage chemical process. Organic extractants were initially designed for uranium recovery, but were later demonstrated to function effectively in the extraction of copper. Organic extractants are specifically employed after the application of an initial leaching solution (hereinafter designated as a "lixivant solution") to copper ore materials. This step generates a lixivant product containing copper ions therein. The organic extractants are then used to "extract" and remove copper ions from the lixivant product to generate a copper ion-rich organic solution. As discussed further below, many different organic extractants may be obtained from a variety of commercial sources including the Henkel Corporation (Mineral Industry Division) of Tucson, Ariz. (which markets organic extractants under the names "LIX®-65", "LIX®-84", "LIX®-860" and others), and Acorga Ltd. which likewise markets extractants under the name PT.50. Organic extractants sold under these designations which are of primary interest in this case consist of hydroxyphenyl oximes having the following basic chemical formula:

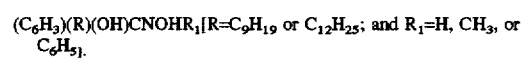

This structure is illustrated as follows:

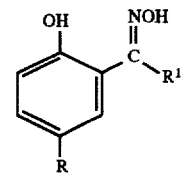

Other compositions (which are commercially available from the Henkel Corporation (Mineral industry Division) of Tucson, Ariz. include: (1) "LIX®-622N" [5-nonylsalicylaldoxime]; (2) "LIX®-984N" [a mixture of 2-hydroxy-5-nonyl-acetophenone oxime and 5-nonylsalicylaldoxime]; (3) "LIX®-54" [$C_6H_5COCH_2C_7H_{15}$]; and (4) "LIX®-63" which has the following structure

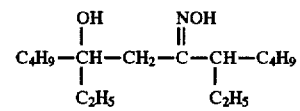

These materials are currently being used on a large-scale basis in many different countries. In particular, they form an essential part of a basic process known as "SX/EW". The term "SX/EW" stands for "solvent extraction/electrowinning", with the term "electrowinning" being defined above. To illustrate the manner in which organic extractants are used in this procedure, the following basic steps summarize the SX/EW process (1) An initial lixivant is first selected for use in leaching copper ions from copper ore. Many different lixivants may be employed for this purpose. Representative lixivants include but are not limited to sulfuric acid ($H_2SO_4$); a combination of $H_2SO_4$ and $Fe_2(SO_4)_3$ (primarily for sulfide-containing ore materials); acidic chloride solutions (e.g. ferric chloride [$FeCl_2$] or cupric chloride [CuCl]); nitrate solutions; ammonia, and ammonium salt compositions.

(2) The selected lixivant is then applied to the ore, with the lixivant being allowed to percolate downwardly into the ore. As a result, copper ions are leached from the ore and collected within the lixivant to generate a lixivant product which consists of a copper ion concentrate (also known as a "pregnant leach solution"). Further detailed information regarding the lixivant leaching process is disclosed in U.S. Pat. No. 5,476,591 to Green et al. which is incorporated herein by reference.

(3) The lixivant product/copper ion concentrate is thereafter combined (e.g. mixed) with a selected organic extractant as described above. Preferred compositions for this purpose will again consist of hydroxyphenyl oximes having the following basic chemical formula:

$(C_6H_3)(R)(OH)CNOHR_1 [R=C_9H_{19}$ or $C_{12}H_{25}$; and $R_1$=H; $CH_3$, or $C_6H_5]$.

Commercially-available organic extractant compositions (including the materials listed above) typically consist of a mixture containing about 90–95% of a petroleum dilutant (e.g. kerosene or tridecanol) and about 5–10% hydroxyphenyl oxime. Prior to combination of the organic extractant and the lixivant product, the organic extractant will contain little or no copper ions therein (depending on whether a fresh or recycled extractant supply is involved) and is also known as a "barren organic extractant". During the mixture of these components, copper ions within the lixivant product are transferred directly into the barren organic extractant. As a result, a first organic phase is produced (which consists of a "loaded organic extractant" containing copper ions from the lixivant product) and a first aqueous phase (also known as the "raffinate") which consists of the lixivant solution which lacks any substantial or appreciable amounts of dissolved copper therein. Both the first aqueous phase and the first organic phase spontaneously separate into discrete layers based on substantial differences in polarity and other physical factors. The first aqueous phase (e.g. the raffinate) is either discarded, stored for future use, or immediately reused on additional amounts of ore. The first organic phase is retained for further processing in accordance with the steps described below.

At this stage, it should be noted that the initial lixivant product (e.g. the pregnant leach solution) prior to treatment with the organic extractant will typically have a significant amount of solid waste material therein. This waste material (which may include fine dirt, sand, rock dust, vegetable matter, mineral residue, miscellaneous suspended solids, and the like) typically comes from raw ore or other sources. Since, in conventional SX/EW processes, the tixivant product is stored outdoors in a large "pond-type" open area environment, solid waste matter may be transferred into the lixivant product by wind, rain, and other environmental forces. The presence of these materials in the lixivant product can reduce the operating efficiency of the system at this stage and in subsequent stages. For example, the existence of solid waste matter carried over into the various phases of the SX/EW treatment system can result in increased phase separation time and/or incomplete phase separation. A lack of complete phase separation can likewise cause a significant amount of the organic extractant to remain within the treated lixivant solution or other aqueous phases generated during treatment. In this regard, considerable losses of the expensive organic extractant can occur. As discussed further below, the present invention is designed to avoid these problems so that a more economical and efficient copper extraction process can take place.

(4) The first organic phase (e.g. the "loaded organic extractant") is then placed in direct physical contact (mixed) with an electrolyte solution (which, at this stage, is also known as a "lean electrolyte solution"). Representative electrolyte solutions include an aqueous sulfuric acid ($H_2SO_4$) solution which will contain about 80–95% by weight water, about 5–20% by weight sulfuric acid, and about 0–0.5% by weight cobalt (in the form of cobalt oxide or metallic cobalt powder) which (if used) is designed to control anode losses and improve cathode plating in the electrowinning stages of the system. Other representative electrolyte solutions include but are not limited to strong acid materials such as HCl which are selected in accordance with preliminary tests on the materials being treated. When these materials are combined, the desired copper ions from the loaded organic extractant are transferred into the electrolyte solution with the corresponding creation of a second organic phase and a second aqueous phase. The second organic phase will consist of the original organic extractant which lacks any substantial or appreciable amounts of copper ions therein (again conventionally known at this stage as the "barren organic extractant"). In contrast, the second aqueous phase (also known as the "rich electrolyte") will consist of the electrolyte solution containing the copper ions transferred from the first organic phase. The second organic phase can thereafter be routed back to subsequent portions of the system for reuse in treating additional copper-containing lixivant materials. However, the presence of extraneous solid waste matter within both phases at this stage will again result in (1) increased phase separation time; and (2) incomplete phase separation which can cause significant amounts of the organic extractant to remain within the second aqueous phase (e.g. the rich electrolyte). Both of these problems further increase the losses of valuable organic extractant materials and generally diminish the operating efficiency of the entire copper processing system.

(5) Finally, the second aqueous phase (which contains the desired copper ions and is again characterized as the "rich electrolyte") is transferred into a conventional electrowinning system. Within the electrowinning system, the second aqueous phase is placed in contact with at least one cathode and at least one anode, followed by the application of electricity to the electrolyte. This process causes copper from the second aqueous phase to be plated onto the cathode in elemental form, thereby completing the copper recovery process. However, the presence of extraneous solid waste material in the second aqueous phase (e.g. the rich electrolyte) at this stage can adversely interfere with the electrowinning process. Solid materials within the rich electrolyte will result in decreased current efficiency within the system and a reduction in purity of the plated copper product caused by the presence of suspended contaminants including dirt, grease, and other comparable materials.

As described above, the presence of suspended contaminants within an SX/EW system can cause considerable problems and economic losses. Once these materials enter the system at any stage (especially during the initial ore treatment step), they will typically remain within all of the subsequently-formed phases (both organic and aqueous). It is therefore important to remove these contaminants from the system as completely as possible. The present invention solves this problem in a highly effective manner with a minimal number of process steps and equipment. As a result, numerous benefits are achieved including a considerable reduction in the amount of organic extractant which is lost during the various stages of the production process, a decrease in processing time, and more effective electrowinning. The present invention therefore satisfies a long-felt need in the copper processing industry as discussed below.

SUMMARY OF THE INVENTION

It is an object of the present invention to provide an improved method for the recovery of copper from copper ore in a solvent extraction/electrowinning ("SX/EW") system.

It is another object of the invention to provide an improved SX/EW copper recovery method which is highly cost efficient and economical.

It is another object of the invention to provide an improved SX/EW copper recovery method which is characterized by a substantial reduction in operating costs through the purification and reuse of chemical reagents (particularly organic extractants).

It is another object of the invention to provide an improved SX/EW copper recovery method which is also characterized by decreased processing times compared with conventional production methods.

It is another object of the invention to provide an improved SX/EW copper recovery method in which the final electrowinning step occurs with a maximum degree of electrical efficiency which substantially facilitates the production of highly pure copper.

It is a further object of the invention to provide an improved SX/EW copper recovery method which specifically reduces operating costs by decreasing the amount of extractants that are needed in the SX/EW procedure.

It is a still further object of the invention to provide an improved SX/EW copper recovery method which substantially increases the separation efficiency of the system so that desired materials (e.g. copper ions) are more easily, rapidly, and effectively isolated.

It is an even further object of the invention to provide an improved SX/EW copper recovery method which provides all of the foregoing benefits by selectively removing suspended solid waste matter from the processing system in a unique manner using membrane filtration technology so that the following goals can be achieved: (1) the improved recovery of organic extractants which would normally be associated in an emulsion-like state with the suspended solid waste matter; (2) greater separation efficiency of the various organic and aqueous phases within the system which is normally hindered by substantial amounts of suspended solids; (3) a reduction in system maintenance (e.g. cleaning) requirements; (4) the more efficient use of organic extractants as outlined above in item (1); (5) increased current efficiency in the electrowinning stages of the process which provides more economical and rapid copper recovery; and (6) the production of a final copper product having improved purity levels.

In accordance with the foregoing objects and benefits, the present invention involves a substantially improved SX/EW process for removing and recovering copper from copper ore. Compared with prior systems, the claimed invention offers considerable improvements in operating cost, production time, conservation of materials, and copper purity levels. The primary goal of the claimed invention is the selective removal of suspended solid waste materials from the various phases within the system. Solid waste contaminants can cause numerous problems as noted above. By removing these materials, the foregoing problems are avoided. Removal of solid waste matter from the system is accomplished in a unique manner using membrane filtration technology in two primary embodiments. While both of these embodiments accomplish the main goals of the claimed invention (e.g. the removal of solid waste materials from the organic extractants within the system), they each involve different processing steps. The selection of any particular embodiment in a given situation will depend on a variety of factors as determined by preliminary pilot experimentation. These factors include the desired output of the system, the environmental (e.g. weather) conditions associated with the SX/EW processing facility, the type of ore being treated, the size of the facility, and other considerations.

A brief summary of the two main embodiments in this case will now be provided. The following "Detailed Description" section will include all of the necessary details to enable complete implementation of the claimed invention by individuals skilled in the art.

In accordance with a first embodiment of the invention, a method for recovering copper from copper ore is accomplished by initially providing a supply of copper ore which is thereafter placed in contact with a lixivant (e.g. leaching) solution. Representative and preferred lixivant solutions will be discussed below. The lixivant solution extracts copper ions from the ore to produce a lixivant product which comprises the lixivant solution in combination with copper ions obtained from the ore. In addition, the lixivant product further includes at least one suspended solid waste material therein. The term "suspended solid waste material" can involve many compositions derived from numerous sources including the ore itself. Likewise, contaminants may be introduced into the system from the external environment since the initial contact between raw copper ore and the lixivant will typically occur outdoors directly at a mine site. In addition, prior to subsequent treatment, the lixivant product containing the desired copper ions is typically stored in large, uncovered pond-like structures which are subject to many environmental influences. Representative compositions encompassed within the term "suspended solid waste material" will include but not be limited to fine dirt, dust, rock particles, sand, clay, silt, and the like. However, the present invention shall not be limited to the removal of any particular solid compositions. While most of the solid waste matter will be introduced into the system at this stage of the copper recovery process, the present embodiment is also capable of removing additional solid wastes which enter the system at later stages as discussed below. Removal of the suspended solid waste materials provides many important benefits as described above. These materials can cause numerous problems ranging from decreased separation efficiency to diminished current flow in the electrowinning stages of the system. Thus, the removal of these materials is a primary goal of the claimed process.

Once the lixivant product has been produced (which contains the desired copper ions), it is thereafter combined (mixed) with a selected organic extractant in a primary containment vessel. While the present invention shall not be limited to any particular organic extractant for this purpose, exemplary and preferred organic extractants will generally comprise at least one hydroxyphenyl oxime having the following basic chemical formula:

$(C_6H_3)(R)(OH)CNOHR_1$ [wherein $R=C_9H_{19}$ or $C_{12}H_{25}$; and $R_1=H$, $CH_3$, or $C_6H_5$], as well as the other compositions listed above in the "Background" section. Further information on these materials (including commercial sources) will be provided below. Combination of the lixivant product and the organic extractant will generate a mixed liquid product comprising a first aqueous phase and a first organic phase. The first aqueous phase will consist of the lixivant solution which lacks any substantial or appreciable amounts of copper ions which were previously dissolved therein, with the first organic phase comprising the organic extractant in combination with the copper ions (which were transferred into the first organic phase from the lixivant product).

Next, the first organic phase is separated from the first aqueous phase so that both phases are no longer together (e.g. the removal of one phase from the other). This is readily accomplished by conventional physical techniques (discussed below) since both phases spontaneously gravitate into separate fractions caused by significant polarity and other physical differences between them. The first organic phase is then combined with a selected electrolyte solution in a secondary containment vessel. Representative and preferred electrolyte solutions will be discussed below. Combination of these materials generates a chemical mixture which consists of a second aqueous phase and a second organic phase. The second aqueous phase contains the electrolyte solution in combination with the copper ions which were transferred into the second aqueous phase from the first organic phase, with the second organic phase comprising the organic extractant lacking most or all of the copper ions therein.

The second organic phase is thereafter separated from the second aqueous phase so that both phases are no longer together (e.g. the removal of one phase from the other). This is again accomplished by conventional physical techniques (discussed below) since both phases gravitate into distinct fractions caused by polarity differences between them. At this stage, the second organic phase further includes at least a portion of the suspended solid waste material therein which was originally obtained from the lixivant product and carried through the system from phase to phase. Also included is a residual amount of electrolyte solution from the second aqueous phase in combination with the solid waste material. The residual amount of electrolyte was left over after the second aqueous phase was separated from the second organic phase. Complete removal of the second aqueous phase from the second organic phase is hindered due to physical interactions and emulsification reactions caused by the suspended solid waste material within the system at this stage as discussed further below.

At least a portion of the second organic phase is then processed to remove the solid waste material therefrom. The entire second organic phase may be treated to remove the solid waste material or only part of the second organic phase may be processed in this manner. Treatment of the entire second organic phase will be undertaken in large, high capacity systems which can handle substantial amounts of liquid materials. However, most systems suitable for accomplishing the goals described herein will bleed off a portion of the second organic phase (e.g. the portion which contains a majority of the suspended solid waste matter.) This portion is then processed to remove the solid waste material therefrom. In a preferred embodiment suitable for most purposes, about 1–10% by weight of the second organic phase will be removed for processing which will provide sufficient cleaning of the system with minimal fluid capacity requirements. The remaining amount of the second organic phase which is not processed (e.g. not removed in accordance with the foregoing procedure) will then be transferred back into the primary containment vessel for reuse within the system in the treatment of subsequent amounts of copper-containing lixivant product as discussed below. While certain amounts of the solid waste material may nonetheless be carried back into the initial stages of the system when only part of the second organic phase is treated, superior results will still be achieved compared with systems in which all of the solid waste material remains in the system. In this regard, even the removal of small amounts of the solid waste material will improve the SX/EW process and increase the purity level of the final copper product and the overall efficiency of the processing system. Whether all or part of the second organic phase is processed, both of these alternatives shall be deemed equivalent in the present invention.

In accordance with the claimed process (discussed in specific detail below), the portion of the second organic phase removed from the system as noted above is treated to remove the solid waste material therefrom. To accomplish organic extractant recovery, removal of the solid waste material, and the other goals described above, at least one filtration membrane is provided which includes a plurality of pores therethrough. Each of the pores has a diameter sufficient to prevent passage of the solid waste material therethrough while allowing passage of the organic extractant and residual amount of electrolyte solution present in the removed portion of the second organic phase. The filtration membrane is selected from the group consisting of a microfiltration membrane and an ultrafiltration membrane. In a preferred embodiment designed to achieve a maximum degree of separation efficiency, each of the pores within the selected filtration membrane will have a diameter of about 0.001–1.03 microns. However, the present invention shall not be limited to any particular numerical parameters which are provided herein for example purposes in accordance with preferred embodiments of the invention. The precise parameters to be used in a given situation will be determined in accordance with preliminary pilot studies on the materials to be processed and the selected system of interest.

To process the removed portion of the second organic phase, it is delivered to the filtration membrane so that it flows onto the membrane. A preferred flow rate associated with the delivery of this material to the membrane is about 10–100 GPM, although the specific rate for a given situation may be varied in accordance with many parameters, including the type of materials being processed, the desired size of the system, and other considerations. As a result, a permeate is generated which passes through the membrane (e.g. at an optimum flux rate of about 10–30 GFD [gallons per ft$^2$ per day]). A retentate is likewise produced which does not pass through the membrane. The retentate consists of the solid waste material, with the permeate comprising a recovered supply of organic extractant lacking the suspended solid waste material therein in combination with a recovered supply of electrolyte solution (which is present in a smaller amount compared with the recovered organic extractant.)

The recovered supply of organic extractant is thereafter transferred back to the primary containment vessel for use in treating subsequent amounts of the copper-containing lixivant product which later enter the system. In a preferred embodiment, transfer of the recovered supply of organic extractant back to the primary containment vessel is accomplished by first delivering the entire permeate (e.g. the recovered supply of organic extractant plus the small amount of recovered electrolyte solution) to the secondary containment vessel. The permeate will then combine with the materials therein (e.g. incoming amounts of the second organic phase and the second aqueous phase). However, delivery of recovered organic and electrolyte materials into the secondary containment vessel will not include the solid waste materials previously within the system which were removed in accordance with the foregoing filtration step. Thereafter, the recovered supply of organic extractant in combination with the second organic phase in the secondary containment vessel can be passed in combination from the secondary containment vessel back into the primary containment vessel after separation (e.g. removal) from the second aqueous phase. Phase separation is readily accomplished by conventional physical techniques (discussed below) since both phases spontaneously gravitate into separate fractions caused by significant polarity and other physical differences between them. As a result, the organic components of the membrane permeate (e.g. recovered organic extractant can be removed from the aqueous materials in the system and transferred back into the primary containment vessel for reuse in treating subsequent amounts of the lixivant product which later enter the system. It should also be noted that the recovered supply of electrolyte solution obtained from the permeate will combine with the second aqueous phase in the secondary containment vessel. Both of these components in combination can then be separated (e.g. removed) from the organic materials within the system as discussed above.

The second aqueous phase which remains after removal and treatment of the second organic phase is placed in contact with an anode and a cathode in a conventional electrowinning system. Electricity is then applied to the second aqueous phase. As a result, copper ions within the second aqueous phase are removed and plated onto the cathode as metallic copper which can thereafter be collected and removed from the system using conventional techniques. The electrowinning process occurs in a rapid and highly efficient manner since substantial amounts of the solid waste material were previously removed from the system as a result of the above-described phase separations and filtration processes.

Many possible modifications to the foregoing procedure may be undertaken, depending on the testing environment, desired system output, and other factors as determined by routine preliminary experimentation. For example, to achieve optimum results while reducing cleaning and maintenance requirements, the filtration membrane will preferably be of a cross-flow type (discussed in substantial detail below) which includes a first end and a second end. Delivery of the removed portion of the second organic phase to the filtration membrane will involve supplying the removed portion to the first end so that it flows onto the membrane and travels across it from the first end to the second end. As a result, the permeate and retentate are produced during movement of the second organic phase across the membrane. The retentate will leave the membrane at the second end, with continued movement of the foregoing materials across the membrane from the first end to the second end preventing cloggage of the membrane pores.

Finally, regarding reuse of the recovered supply of organic extractant in the permeate, multiple options are available. Both of these options ultimately transfer the recovered organic extractant back to the primary containment vessel for reuse within the system. The first option (which is described above) involves delivery of the entire permeate back to the secondary containment vessel where it mixes with the materials therein (e.g. the second organic phase and the second aqueous phase). Thereafter, the recovered supply of organic extractant in the permeate combines with the second organic phase in the secondary containment vessel. These materials (in combination) are then passed from the secondary containment vessel back into the primary containment vessel for reuse after phase separation from the second aqueous phase. In an alternative approach, the recovered supply of organic extractant and the recovered supply of electrolyte solution are allowed to phase-separate so that a third organic phase (containing organic extractant) and a third aqueous phase (containing electrolyte solution) are produced. Again, phase separation of these components (e.g. removal from each other) may be accomplished by conventional physical techniques (discussed below) since both phases will spontaneously gravitate into separate fractions caused by significant polarity and other physical differences between them. The third organic phase obtained from this process can then be delivered directly to the primary containment vessel (without passing through the secondary containment vessel) for use as the organic extractant in treating subsequent amounts of copper-containing lixivant products which enter the system. Likewise, the third aqueous phase can be separately delivered into the secondary containment vessel for reuse as the electrolyte solution therein. Both of these methods accomplish the same goal, namely, transferring the recovered supply of organic extractant from the permeate back to the primary containment vessel. In this regard, both methods shall be deemed equivalent in accordance with the present invention.

As stated above, the goals of the claimed invention are to remove solid waste matter from the organic extractant and reuse as much organic extractant as possible. In addition to the embodiment listed above, a second embodiment is also provided which produces excellent results. While many of the steps in the second embodiment are substantially the same as those in the first embodiment, all of the steps associated with the second embodiment will now be summarized to provide a clear and complete disclosure.

In accordance with a second embodiment of the claimed process, a supply of copper ore is initially provided which is placed in contact with a lixivant (leaching) solution as discussed above. The lixivant solution extracts copper ions from the ore to produce a lixivant product which comprises the lixivant solution in combination with copper ions obtained from the ore. In addition, the lixivant product further includes at least one suspended solid waste material therein as previously discussed.

Once the lixivant product has been produced (which contains the desired copper ions), it is thereafter combined (mixed) with a selected organic extractant in a primary containment vessel. The organic extractant used in this embodiment is the same as the extractant discussed in the first embodiment. An exemplary and preferred organic extractant will again comprise at least one hydroxyphenyl oxime having the following basic chemical formula:

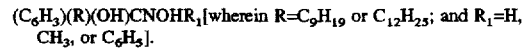

Combination of the lixivant product and the organic extractant will generate a mixed liquid product comprising a first aqueous phase and a first organic phase. The first aqueous phase will consist of the lixivant solution lacking any substantial or appreciable amounts of copper ions which were previously dissolved therein, with the first organic phase comprising the organic extractant in combination with the copper ions (which were transferred into the first organic phase from the lixivant product). The first organic phase will also include at least a portion of the suspended solid waste material originally obtained from the lixivant product.

Next, the first organic phase is separated from the first aqueous phase so that both phases are no longer together (e.g. the removal of one phase from the other). This is readily accomplished by conventional physical techniques (discussed below) since both phases spontaneously gravitate into separate fractions caused by significant polarity differences between them. At this stage, the first organic phase will again include at least a portion of the suspended solid waste material originally obtained from the lixivant product and carried through the system. Combined with the solid waste material is a residual amount of the first aqueous phase which was left over after the first aqueous phase was separated from the first organic phase. Complete removal of the first aqueous phase from the first organic phase is hindered due to physical interactions and emulsification reactions caused by the suspended solid waste material within the system at this stage as discussed further below.

In accordance with this embodiment of the present invention, at least one portion of the first organic phase is processed to remove the solid waste material therefrom. This step will facilitate the proper and complete separation of subsequent organic and aqueous phases within the system, will reduce losses of organic extractant in the system, and will likewise enhance the efficiency of the electrowinning process as described below. To process the first organic phase, it is divided into a primary portion and a secondary portion. In a preferred embodiment, about 1–10% by weight of the total first organic phase will be removed as the primary portion, with about 90–99% by weight of the total first organic phase being removed as the secondary portion. The primary portion of the first organic phase is then delivered to a filtration system for removal of the solid waste material. To accomplish this goal, at least one filtration membrane is provided which has a plurality of pores therethrough as stated above, with each of the pores having a diameter sufficient to prevent passage of the solid waste material while allowing passage of the organic extractant and copper ions. The filtration membrane is selected from the group consisting of a microfiltration membrane and an ultrafiltration membrane, with a preferred pore diameter of about 0.001–1.0 microns.

The primary portion of the first organic phase is delivered to the filtration membrane so that it flows directly onto the membrane surface. A preferred flow rate associated with delivery of the primary portion of the first organic phase to the membrane is about 10–100 GPM, although this rate may be varied in accordance with many parameters, including the type of materials being processed and other considerations. As a result, a permeate is generated which passes through the filtration membrane (at an optimum flux rate of about 10–30 GFD). A retentate is likewise produced which does not pass through the membrane. The retentate consists of the solid waste material, with the permeate consisting of a recovered supply of organic extractant lacking the solid waste matter therein, along with a recovered supply of lixivant solution which was left over from the initial separation of the first organic phase and the first aqueous phase as discussed above. The permeate (which mostly consists of the recovered supply of organic extractant) is thereafter routed back into the primary containment vessel. Within the primary containment vessel, it is combined with incoming amounts of copper ion-containing lixivant product and organic extractant materials. This reuse of the "cleaned" organic extractant provides many benefits including improved separation efficiency in subsequent portions of the system resulting from decreased levels of solid waste materials. Improved separation efficiency reduces the losses of organic extractant materials during the treatment process and contributes to a greater degree of overall system efficiency. Likewise, the removal of solid waste materials as described above substantially improves the effectiveness of the electrowinning process so that a final copper product of greater purity can be generated.

The secondary/unfiltered) portion of the first organic phase is then combined with a selected electrolyte solution in a secondary containment vessel. While certain amounts of the solid waste material may be carried into the electrowinning system by the unfiltered secondary portion of the first organic phase, superior results will nonetheless be achieved compared with systems in which all of the suspended solid waste matter enters the electrowinning stages. Even the removal of small amounts of solid waste matter from the first organic phase will improve the electrowinning procedure and increase the purity level of the final copper product.

Representative and preferred electrolyte solutions will be discussed below. Combination of these materials generates a chemical mixture which comprises a second aqueous phase and a second organic phase. The second aqueous phase contains the electrolyte solution in combination with the copper ions which were transferred into the second aqueous phase from the first organic phase, with the second organic phase comprising the organic extractant lacking any substantial or appreciable amounts of the copper ions therein.

Next, the second organic phase is separated from the second aqueous phase so that both phases are no longer together (e.g. the removal of one phase from the other). This is readily accomplished by conventional physical techniques (discussed below) since both phases spontaneously gravitate into distinct fractions caused by polarity differences between them. The second aqueous phase is then placed in contact with an anode and a cathode in a conventional electrowinning system. Electricity is thereafter applied to the second aqueous phase. As a result, copper ions are removed from the second aqueous phase and plated onto the cathode as metallic copper. The electrowinning process occurs in a rapid and highly effective manner since a substantial portion of the suspended solid waste matter originally present within the first organic phase was previously removed as discussed above. Accordingly, this embodiment of the claimed process provides numerous benefits, namely, (A) the removal of all or part of the solid waste material originally introduced into the system; (B) improved separation efficiency of the various phases in the system which reduces organic extractant losses; and (C) increased current efficiency in the electrowinning stages of the process.

As in the first embodiment, various modifications can be made to the second embodiment, depending on operational factors and goals as determined by routine preliminary experimentation. For example, to achieve optimum results while reducing maintenance requirements, the filtration membrane will again be of a cross-flow type in a preferred embodiment (discussed below) which includes a first end and a second end. Delivery of the primary portion of the first organic phase to the filtration membrane will initially involve supplying the first organic phase to the first end of the filtration membrane. As a result, the primary fraction of the first organic phase will flow onto the membrane and travel across the membrane surface from the first end to the second end. In this manner, the permeate and retentate are produced during movement of the first organic phase across the membrane. The retentate will leave the membrane at the second end, with continued movement of the first organic phase across the membrane from the first end to the second end preventing cloggage of the membrane pores.

The present invention satisfies a long-felt need for an SX/EW system which removes solid waste matter from the system and controls operational losses of organic extractants. As a result, electrowinning and copper recovery can proceed with a maximum degree of efficiency in order to generate high-purity copper. Accordingly, the claimed invention and its various embodiments represent an advance in the art of copper processing.

These and other objects, features, and advantages of the invention will be provided below in the following Brief Description of the Drawings and Detailed Description of Preferred Embodiments.

DETAILED DESCRIPTION OF THE PREFERRED EMBODIMENTS

Figure 1:
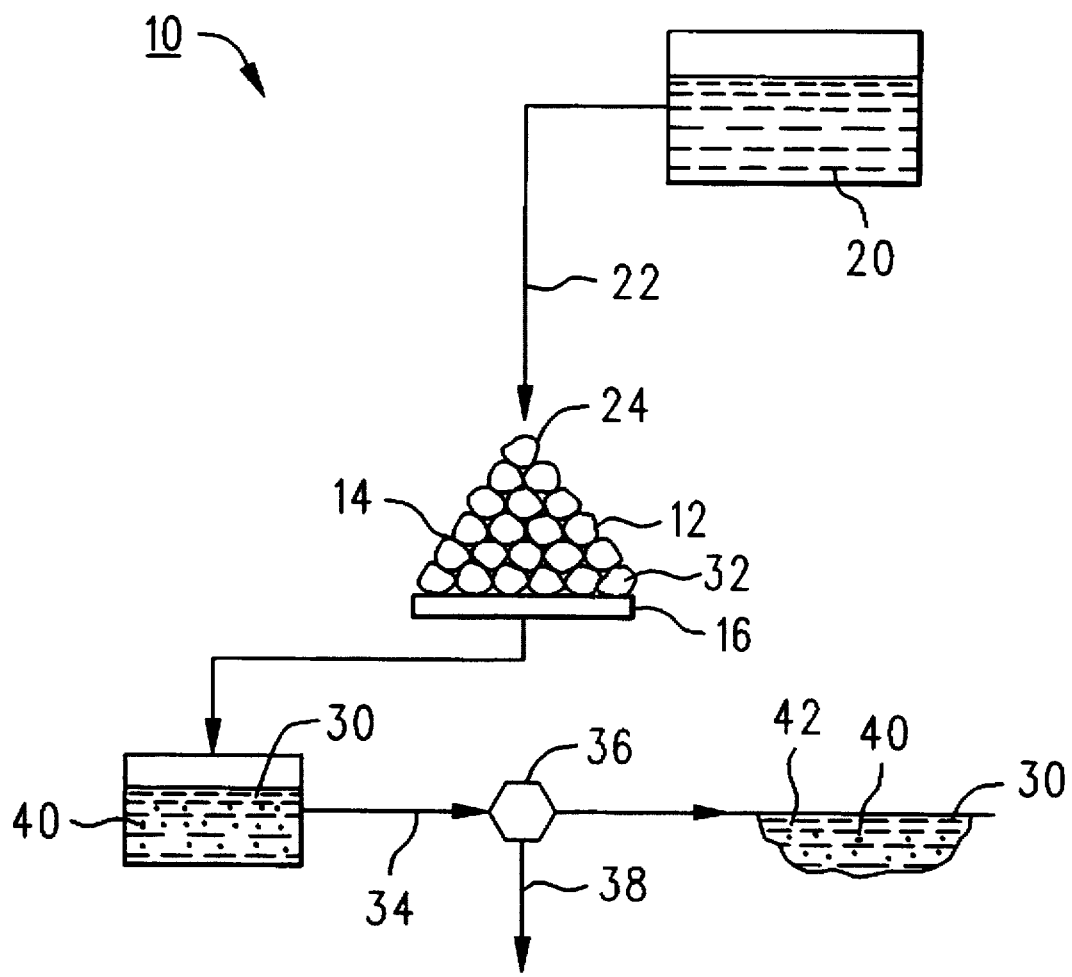
FIG. 1 is a schematic flow diagram illustrating the treatment of copper ore with a lixivant solution to produce a copper-containing lixivant product.

In accordance with the present invention, unique and highly efficient methods are disclosed for removing copper ions from copper ore materials. These methods involve the use of chemical lixivant solutions (e.g. leaching agents) which are initially applied to raw ore materials to generate a copper-containing lixivant product. Copper ions are then removed using organic extractant materials which are subsequently processed through a series of phase separations and an electrowinning stage to yield high-purity elemental copper. However, as discussed further below, the present invention is characterized by unique methods for periodically cleaning the organic extractant materials at various stages to remove solid waste materials therefrom. The presence of excess solid waste materials in the treatment system (which progressively increases in concentration over time due to accumulation at the liquid-liquid interfaces) can create numerous problems including (A) incomplete phase separations caused by emulsion-type interactions between the solid waste materials and various liquid components in the system which increase organic extractant losses; (B) increases in maintenance/cleaning requirements within the system which result in additional system down-time; and (C) a decrease in the purity of the final copper product caused by interactions between the solid waste materials and the electrolyte compositions in the electrowinning stages of the process. By periodically removing solid waste matter from the organic extractants during treatment, system efficiency and product purity levels are increased. Likewise, the foregoing problems are avoided. The present invention therefore represents an advance in the art of copper recovery and purification.

A. THE INITIAL COPPER LEACHING PROCESS

As stated above, the claimed invention involves a unique, economical, and highly effective method for producing a purified copper product from leaching solutions (lixivants) which contain copper ions obtained from raw ore. Accordingly, the initial leaching stage of the claimed process will be substantially the same in all embodiments of the invention. To provide a thorough and complete understanding of the process from start to finish, a brief explanation of the initial leaching stage will now be presented.

A complete description of the materials, procedures, methods and conditions used to leach copper ions from raw ore is provided in commonly-owned U.S. Pat. No. 5,476,591 to Green et al. which is incorporated herein by reference for all that it teaches. The processes associated with "heap leaching" and solvent extraction of copper ore have been used in various forms for many years. As discussed in Arbiter, N. et al, "Copper hydrometallurgy evolution and milestones", *Mining Engineering*, February 1994 (pp. 118–123) which is also incorporated by reference, the heap leaching of copper ore basically involves the formation of large heaps or piles of ore-containing rock, followed by the application of a "lixivant" (e.g. leaching) solution to each pile. An exemplary and preferred lixivant solution suitable for this purpose consists primarily of $H_2SO_4$. This type of lixivant operates effectively to extract copper from most types of ore, including copper oxide ores. Lixivants containing $H_2SO_4$ will also function effectively in connection with copper sulfide ores, although it may be desirable to add an iron-containing compound/additive (e.g. $Fe_2(SO_4)_3$) to the lixivant. The addition of such materials in order to facilitate the leaching process is known in the art as described in Arbiter, N. et al., supra, p. 119.

After downward passage (percolation) of the lixivant through the piles of ore, a copper-containing lixivant product is generated which contains substantial amounts of dissolved copper (e.g., copper ions) therein. This product must then be treated to remove copper ions therefrom in the most efficient manner possible so that a copper ion concentrate can be generated. As will be discussed further below, the use of organic extractants and electrolytes in a series of phase separations and extractions provides highly effective results. Ultimately, a process called "electrowinning" is used to treat the final copper-containing liquid phase so that a final product consisting of highly pure (generally about +99%) elemental copper can be produced. Electrowinning as a basic process is an established technique in the copper mining industry as discussed in Arbiter, N. et al., supra. In general, electrowinning involves the use of a cathode/anode system in which metallic cations (e.g. copper ions) are plated onto the anode and subsequently treated to obtain an elemental metal product. The level of contaminants within the electrowinning system will determine the purity and yield of the final copper product. As discussed further below, the present invention is designed to minimize losses of organic extractant materials caused by undesired carry-over into other fluid fractions and maximize current efficiency in the electrowinning process by removing solid waste materials from the organic extractants.

With reference to FIG. 1, a representative copper ion leaching process is schematically illustrated at reference number 10. The present invention shall not be limited to any particular parameters, materials, components, ore grades, and equipment used in connection with the leaching process. Any lixivant-based leaching procedure can be used provided that an aqueous copper-containing lixivant product is generated that is subject to copper ion extraction using known organic extractants as discussed below. As shown in FIG. 1, a supply of rock materials 12 comprised of raw copper ore is initially provided which is configured in a heap or pile 14. The term "rock materials" as used herein may involve discrete portions of rock having an average diameter of about 3–12 inches, crushed/powdered rock, or large sections/deposits of ore, all of which are normally treated "in-situ" at a mine site. In a preferred embodiment, the pile 14 is placed on a pad 16 manufactured of rubber or other composition which is substantially inert relative to acidic materials (e.g. $H_2SO_4$) which are normally used in the leaching process. However, in certain applications, the pad 16 may be entirely omitted as determined by preliminary testing.

Thereafter, a chemical lixivant 20 consisting primarily of $H_2SO_4$ is applied to the pile 14 through conduit 22. While the acid concentration of the lixivant 20 may be varied in accordance with a wide variety of parameters including but not limited to the type and character of the ore being treated, an exemplary lixivant 20 will include about 5–25 g/l of concentrated (approx. 97%) $H_2SO_4$ therein. Lixivant materials normally used in connection with the acid leaching of copper ore will have an initial pH of about 1.0–3.0. However, these parameters may again vary in view of the type of ore materials being processed, as well as the amount of such materials to be treated and other factors. As noted above, aqueous lixivant solutions consisting primarily of $H_2SO_4$ are preferred in the present invention. However, the claimed invention shall not be limited exclusively to the use of $H_2SO_4$ compositions, with other materials likewise being suitable for use in the copper leaching process. These other materials include but are not limited to a combination of $H_2SO_4$ and $Fe_2(SO_4)_3$ (primarily for sulfide-containing ore materials), acidic chloride solutions (e.g. ferric chloride [$FeCl_2$] or cupric chloride [$CuCl$]), nitrate solutions, ammonia, and ammonium salt compositions. The selection of any given lixivant 20 will be determined in accordance with preliminary pilot studies on the ore materials being treated.

The lixivant 20 is introduced into the pile 14 of rock materials 12 at the top 24 thereof so that the lixivant 20 is placed in direct contact with the rock (ore) materials 12. Thereafter, the lixivant 20 is allowed to pass downwardly (e.g. percolate) through the pile 14, extracting copper ions from the rock materials 12 (ore) as it passes therethrough. The resulting liquid product (designated herein as a "pregnant leach solution" or "aqueous copper-containing lixivant product" shown in FIG. 1 at reference number 30) is collected as it exits the pile 14 at the bottom 32 thereof.

At this point, the lixivant product 30 contains most of the original lixivant 20 therein (e.g. $H_2SO_4$ in a preferred embodiment), as well as a substantial amount of dissolved copper (copper ions) obtained from the ore. While the amount of copper ions in the lixivant product 30 will necessarily vary based on specific reaction conditions and the type of ore being treated, an average copper ion concentration of about 0.5–3.0 g/l of lixivant product 30 can be expected.

The lixivant product 30 may thereafter pass via conduit 34 into an optional solids filter 36 which is used to remove extraneous particulate matter from the lixivant product 30. In a representative embodiment, the solids filter 36 will consist of a backwashable sand bed filter known in the art or other conventional system of comparable design (e.g. a standard, commercially-available bag filter). Solid materials trapped by the solids filter 36 are ultimately routed out of the system for disposal through conduit 38.

After passage through the optional solids filter 36 (if used), the lixivant product 30 is ready for further processing in accordance with the present invention. In copper ore leaching systems of the type described above (which occur directly at the mine site of concern in most cases) the lixivant product 30 will typically have various amounts of solid waste material therein prior to further treatment notwithstanding the use of optional solids filter 36. This solid waste material (represented at reference number 40 in FIGS. 1–2 and 4) comes from numerous sources and may include fine dirt, sand, rock dust, vegetable matter, mineral residue, miscellaneous suspended solids, and the like. For example, the solid waste material 40 (which is typically characterized as "crud") may originate within the raw ore materials being processed. For numerous reasons including the small particle size of the waste material 40, environmental conditions, and other considerations, a substantial portion of the solid waste material 40 may escape the optional solids filter 36 (if used). Furthermore, the lixivant product 30 (prior to subsequent SX/EW processing) will typically be stored in large open ponds 42 prior to treatment as schematically shown in FIG. 1. During SX/EW treatment, the lixivant product 30 will normally be processed within large "open-walled", unsealed buildings. As a result, solid waste material 40 may be transferred into the copper-containing lixivant product 30 by wind, rain, and other environmental forces, with the amount of contamination caused by solid waste material 40 steadily increasing over time. Additional information involving the solid waste material 40 and its chemical characteristics is provided in Kordosky, G., et al., "Pilot Plant Studies on the Relationship Between Copper Solvent Extraction Reagents and Crud Formation", Preprint N. 96–35 by the Society for Mining, Metallurgy, and Exploration, Inc. (presented at the SME Annual Meeting in Phoenix, Ariz. (U.S.A.) on Mar. 11–14, 1996).

The presence of solid waste material 40 in the lixivant product 30 can reduce the overall efficiency of the entire copper recovery system as discussed further below. For example, substantial amounts of solid waste matter carried over into the various phases of the SX/EW treatment system will result in increased phase separation time and/or incomplete phase separation. A lack of complete phase separation can cause a significant amount of the organic extractant in the system to remain within various aqueous phases generated during treatment. As a result, considerable losses of the expensive organic extractant can occur. Large amounts of solid waste matter can also decrease the operating effectiveness (e.g. current transfer efficiency) in the electrowinning stages of the processing system. As discussed further below, the present invention is designed to avoid these problems so that a more economical and efficient copper extraction procedure can take place.

B. TREATMENT OF THE LIXIVANT PRODUCT TO RECOVER COPPER IONS—FIRST EMBODIMENT

In accordance with a first embodiment of the present invention, the copper-containing lixivant product 30 is treated with an organic extractant, followed by a series of phase separations and electrowinning to generate a final purified elemental copper product. As discussed below, the organic extractant is processed during this procedure to remove at least part of the solid waste material 40 therefrom. Removal of the solid waste material 40 provides many benefits ranging from improved phase separation and increased electrowinning efficiency to more effective utilization of the organic extract (e.g. a reduction in extractant losses caused by incomplete phase separation). To accomplish removal of at least part of the solid waste material 40, a number of unique steps are taken in a specialized treatment system as illustrated schematically in FIG. 2 at reference number 50.

Figure 2:
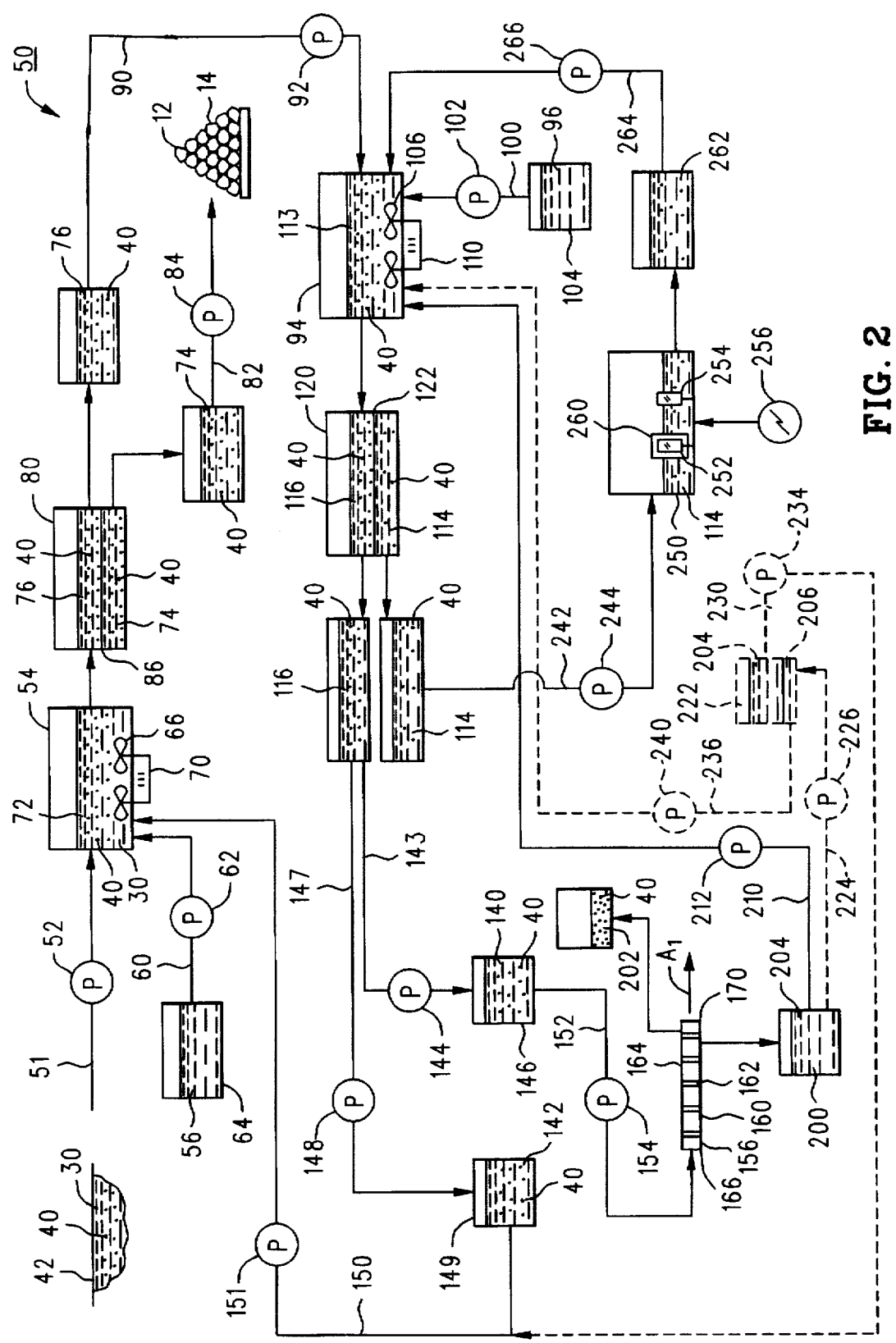
FIG. 2 is a schematic flow diagram of the process steps used in a first embodiment of the present invention to produce purified copper from the copper-containing lixivant product of FIG. 1
Figure 3:
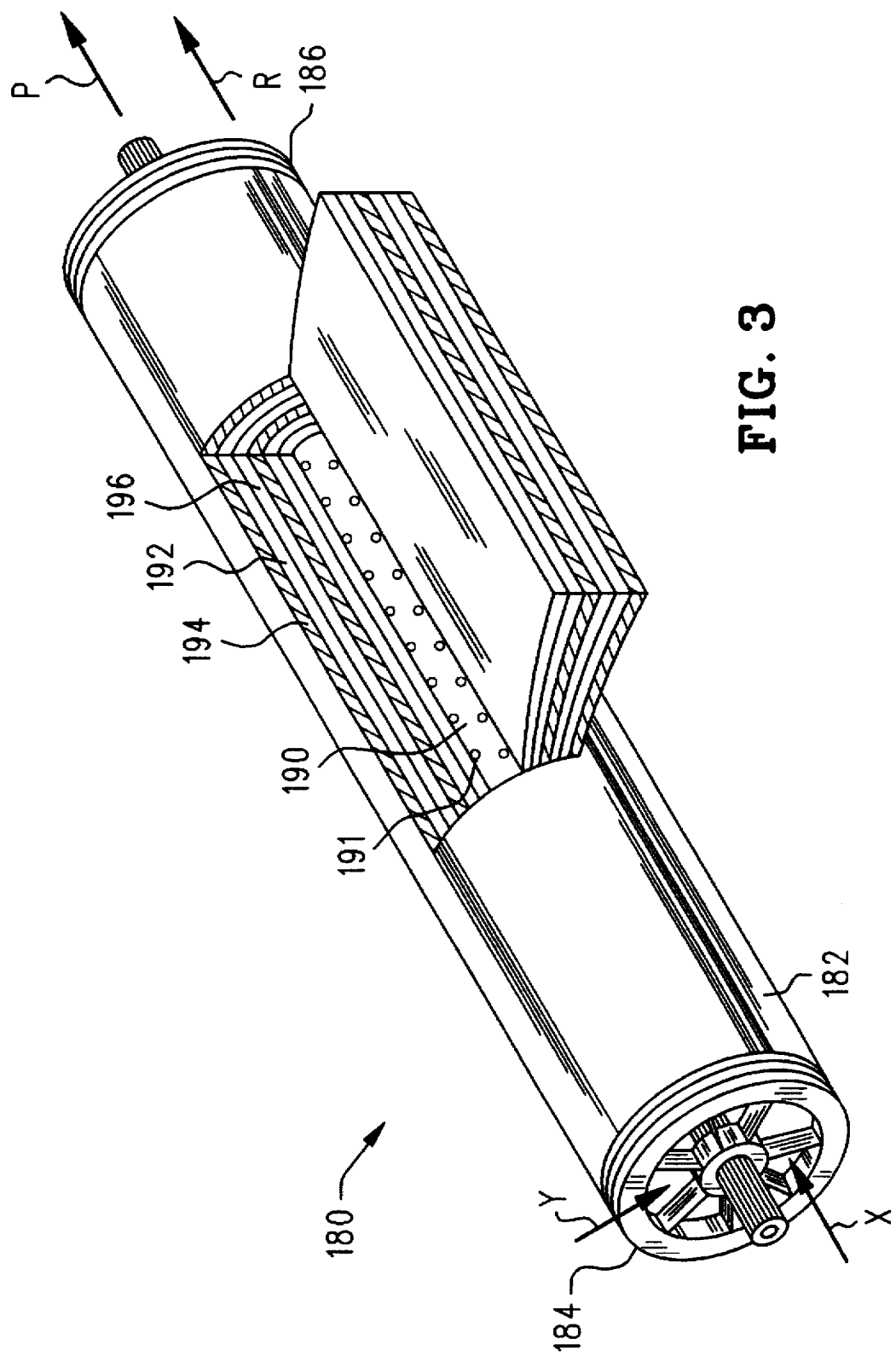
FIG. 3 is a schematic, cross-sectional illustration of a representative membrane filter cartridge unit suitable for use in the claimed processes.
Figure 4:
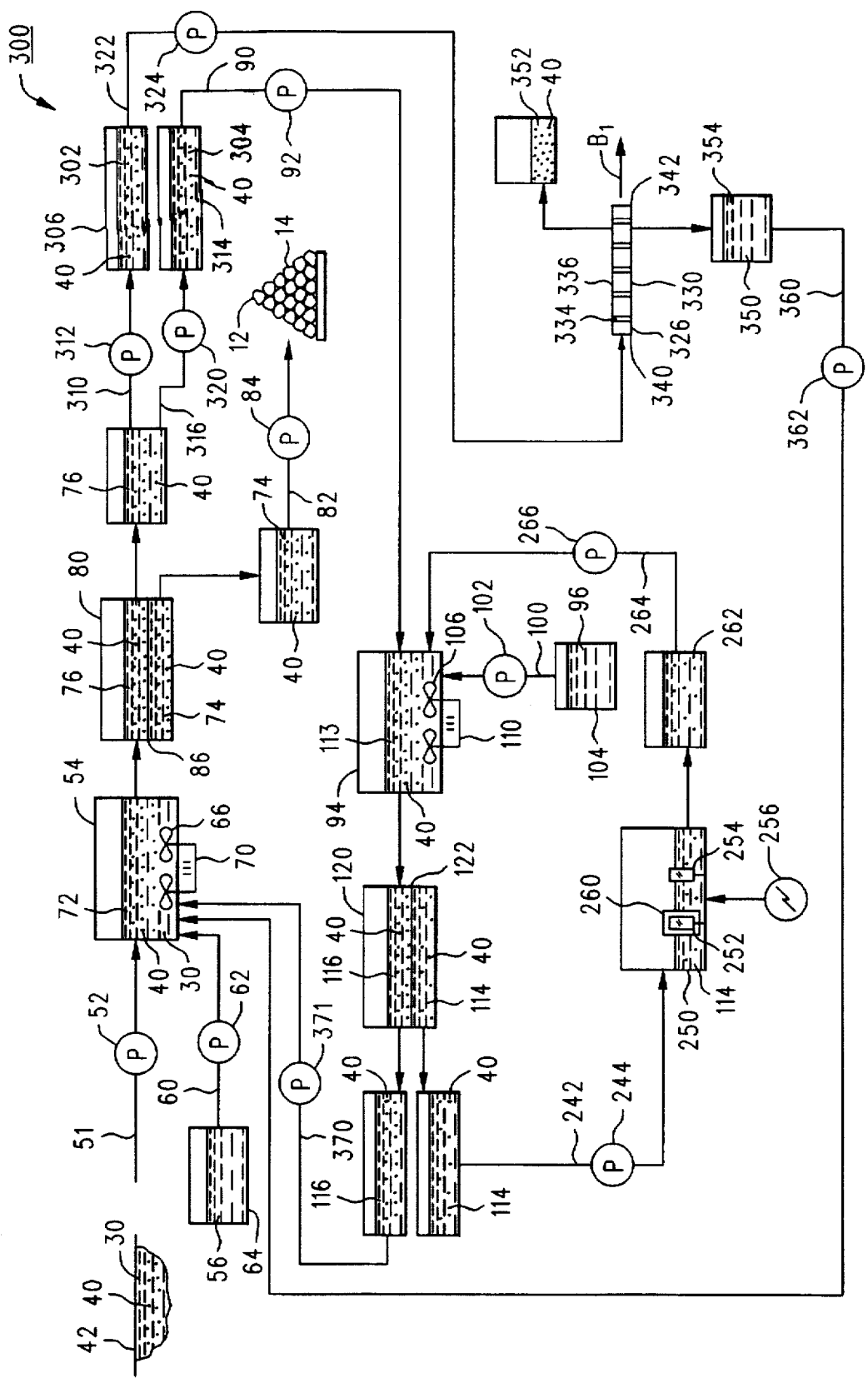
FIG. 4 is a schematic flow diagram of the process steps used in a second embodiment of the invention to yield purified copper from the copper-containing lixivant product of FIG. 1.

With reference to FIG. 2, the copper-containing lixivant product 30 (also known as the "pregnant leach solution" as noted above) is transferred via conduit 51 and in-line pump 52 (e.g. of a conventional centrifugal, volumetric, or other known type) to a primary containment tank or vessel 54. It should be noted that all of the other pumps in the embodiments of FIGS. 2 and 4 as discussed below shall be of the same type as pump 52 unless otherwise indicated. Likewise, all of the conduits, lines, and other fluid transfer components used in the embodiments of FIGS. 2–4 are optimally manufactured from an inert, chemically stable composition including but not limited to high density polyethylene (HDPE) or stainless steel (#316). In a preferred embodiment, the primary containment vessel 54 is likewise manufactured from an inert, acid resistant material (e.g. concrete lined with stainless steel or high density polyethylene (HDPE)). These materials are especially suitable for use in connection with a chemical lixivant 20 which consists primarily of $H_2SO_4$.

Within the primary containment vessel 54, the copper-containing lixivant product 30 is combined with a selected organic extractant 56 which is delivered to the primary containment vessel 54 via conduit 60 and in-line pump 62. At this stage, the organic extractant 56 typically lacks any appreciable or substantial amounts of copper ions therein and is normally known as the "barren organic extractant". Specifically, if fresh (unused) organic extractant 56 is being employed, it will contain substantially no copper ions. If the organic extractant 56 consists of recycled materials (discussed below) it will typically have some copper ions therein which were left over from prior processes as discussed below. The organic extractant 56 (which is retained within a storage tank 64) should be of a type which allows the chemical extraction of copper ions from the copper-containing lixivant product 30. While the claimed invention shall not be limited to any particular type of organic extractant 56, preferred compositions for this purpose will consist of hydroxyphenyl oximes having the following basic chemical formula:

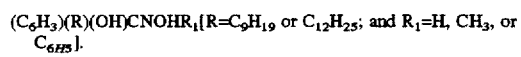

This structure is illustrated as follows:

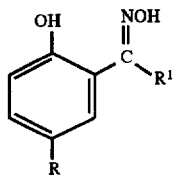

Organic oxime extractants encompassed within the foregoing structure and formula may be obtained from a variety of commercial sources including the Henkel Corporation (Mineral industry Division) of Tucson, Ariz. (which markets such extractants under the names "LIX®-65", "LIX®-84", "LIX®-860" and others), and Acorga Ltd. which likewise markets comparable extractants under the name PT.50. Other compositions suitable for use as the organic extractant 56 (which are commercially available from the Henkel Corporation [Mineral Industry Division]) of Tucson, Ariz. include: (1) "LIX®-622N" [5-nonylsalicylaldoxime]; (2) "LIX®-984N" [a mixture of 2-hydroxy-5-nonyl-acetophenone oxime and 5-nonylsalicylaldoxime]; (3) "LIX®-54" [$C_6H_5COCH_2C_7H_{15}$]; and (4) "LIX®-63" which has the following structure:

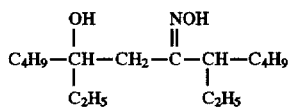

These organic extractant formulations typically consist of a mixture containing about 90–95% by weight of a petroleum dilutant (e.g. kerosene or tridecanol) and about 5–10% by weight extractant. Further information regarding the compositions listed above, organic extractants in general, and organic extractant-based SX/EW processes are discussed in Townson, B., et al., "The Solvent Extraction of Copper—A Perspective", *Mining Magazine*, 162(1): 26–35 (January 1990).

Combination of the selected organic extractant 56 with the copper-containing lixivant product 30 will take place directly within the primary containment vessel 54 as noted above. In a preferred embodiment, the lixivant product 30 will be combined with the organic extractant 56 in a lixivant product 30: organic extractant 56 volume ratio range of about 30–70:70–30. However, the present invention shall not be limited to these parameters, with the particular amount of organic extractant to be used in a given situation being determined by routine preliminary testing. The organic extractant 56 and the lixivant product 30 are mixed within the primary containment vessel 54 by a conventional motor-driven agitator system consisting of a plurality of mixing blades 66 operatively connected to a motor unit 70. Mixing in this manner will typically occur over a time period of about 5–30 minutes. As a result, a mixed liquid product 72 is generated within the primary containment vessel 54. In view of significant polarity differences between the various materials within the mixed liquid product 72, the liquid product 72 spontaneously gravitates (divides) after mixing into two discrete layers consisting of a first aqueous phase 74 (conventionally known as the "raffinate") and a first organic phase 76 (typically characterized as the "loaded organic extractant"). The first aqueous phase 74 will contain the initial chemical lixivant 20 lacking any appreciable or substantial amounts of the copper ions which were previously dissolved therein (e.g. within the lixivant product 30), with the first organic phase 76 containing the organic extractant 56 in combination with the copper ions transferred from the lixivant product 30. It should be noted that the first aqueous phase 74 will typically contain some residual copper ions therein due to inherent limitations in all liquid-liquid extraction systems which prevent 100% recovery (extraction) from taking place. The first aqueous phase 74 and the first organic phase 76 gravitate into discrete layers based on substantial differences in polarity and other physical factors. As illustrated in FIG. 2, the first organic phase 76 will typically reside on top of the first aqueous phase 74. This process occurs rapidly (e.g. in a substantially instantaneous manner) within a settling chamber 80 which may be maintained separately and in fluid communication with the primary containment vessel 54 or formed integrally as part of the primary containment vessel 54. In a preferred embodiment, the settling chamber 80 will be manufactured from the same materials listed above in connection with the primary containment vessel 54.

Next, the first organic phase 76 is separated from the first aqueous phase 74. The term "separated" as used herein shall involve a step in which the first organic phase 76 is removed from the first aqueous phase 74 so that both phases 74, 76 are isolated from each other and no longer together. It is not critical as to which phase 74, 76 is removed first from the settling chamber 80 with the initial removal of either phase 74, 76 being considered equivalent. Separation may be accomplished in a conventional manner (e.g. by the use of a standard weir system [not shown] within the settling chamber 80).

As illustrated in FIG. 2, both the first aqueous phase 74 and the first organic phase 76 will include a portion of the solid waste material 40 suspended therein. The nature and content of the solid waste material 40 is discussed in detail above. The first aqueous phase 74 (which includes the chemical lixivant 20 lacking any appreciable or substantial amounts of copper ions therein) is either discarded, stored for future use, or immediately reused on additional amounts of rock 12 (ore). If immediate reuse is desired, the first aqueous phase 74 is transferred via conduit 82 and in-line pump 84 back to the pile 14 of rock 12 for use in removing additional amounts of copper during continuous operation of the system 50. Since the first aqueous phase 74 is typically reused as discussed above, the presence of various amounts of solid waste material 40 therein will be of minimal consequence.

After separation in the foregoing manner, the isolated first organic phase 76 is retained for further treatment to remove copper ions therefrom. However, at this point, it is important to note that the first organic phase 76 will typically include a portion of the solid waste material 40 suspended therein as previously indicated in combination with a residual amount (not shown) of the first aqueous phase 74 (e.g. the chemical lixivant 20). Complete removal of the first aqueous phase 74 from the first organic phase 76 is hindered by a variety of emulsification reactions which occur at the interface 86 between both phases 76 in the settling chamber 80. These reactions are directly caused by the suspended solid waste material 40 in the system 50. In a typical processing system, the first organic phase 76 (after separation from the first aqueous phase 74 as described above) will include about 90–99% by weight organic extractant 56 (containing copper ions therein), about 0.001–5% by weight solid waste material 40 (which can cause significant problems in the system 50 as discussed further below), and about 1–5% by weight residual first aqueous phase 74 (lixivant 20). Likewise, the first aqueous phase 74 (after separation from the first organic phase 76) will typically include about 90–99% by weight lixivant 20, about 0.001–5% by weight solid waste material 40, and about 1–5% by weight residual first organic phase 76 (organic extractant 56). However, the claimed invention shall not be limited to the numerical values listed above which may vary substantially in view of the particular materials being treated, environmental conditions, and other operational factors.

As previously indicated, the presence of solid waste material 40 within the first aqueous phase 74 will cause a residual amount of the first organic phase 76 (e.g. the organic extractant 56) to be carried over into the first aqueous phase 74. Carry-over of the first organic phase 76 in this manner causes some of the organic extractant 56 to be lost during separation of the first aqueous phase 74 from the first organic phase 76. The present invention is designed to control these losses by removing at least part of the solid waste material 40 from the various organic phases in the system 50 as discussed further below.

With continued reference to FIG. 2, the first organic phase 76 (e.g. the "loaded organic extractant") is then routed via conduit 90 and in-line pump 92 into a secondary containment tank or vessel 94 preferably of the same configuration and size as the primary containment vessel 54 and likewise made of the same inert, acid-resistant materials listed above. Within the secondary containment vessel 94, the first organic phase 76 is combined (e.g. mixed) with a selected electrolyte solution 96 which is delivered to the secondary containment vessel 94 via conduit 100 and in-line pump 102. The electrolyte solution 96 (retained within a storage tank 104 illustrated in FIG. 2) is of a type which allows the chemical extraction of copper ions from the copper-containing first organic phase 76. Prior to combination of electrolyte solution 96 with the first organic phase 76 in the secondary containment vessel 94, the electrolyte solution 96 contains little or no copper or other ions therein and is traditionally known as a "lean electrolyte". If fresh (unused) electrolyte solution 96 is employed, it will be substantially free from metal (e.g. copper) ions. However, if the electrolyte solution 96 consists of recycled materials (discussed below), it will typically have some residual copper and other metal ions therein, but in very small amounts. While the claimed invention shall not be limited to any particular compositions in connection with the electrolyte solution 96, representative materials for this purpose will include an aqueous sulfuric acid ($H_2SO_4$) solution containing about 80–95% by weight water, about 5–20% by weight sulfuric acid, and about 0–0.5% by weight cobalt (in the form of cobalt oxide or metallic cobalt powder) which (if used) is designed to control anode losses and improve cathode plating in the electrowinning stages of the system. Other representative electrolyte solutions include but are not limited to strong acid materials such as HCl which are selected in accordance with preliminary tests on the materials being treated.

Combination of the electrolyte solution 96 with the first organic phase 76 will take place directly within the secondary containment vessel 94 as noted above. In a preferred embodiment, the first organic phase 76 will be combined with the electrolyte solution 96 in a first organic phase 76: electrolyte solution 96 volume ratio range of about 30–70:70–30. However, these parameters may vary in view of the compositions being treated as determined by preliminary testing. The first organic phase 76 and the electrolyte solution 96 are mixed within the secondary containment vessel 94 by a conventional motor-driven agitator system consisting of a plurality of mixing blades 106 operatively connected to a motor unit 110. Mixing in this manner will typically occur over a time period of about 5–30 minutes. As a result, a chemical mixture 113 is generated within the secondary containment vessel 94 as schematically illustrated in FIG. 2. In view of significant polarity differences between the various materials within the chemical mixture 113, it spontaneously gravitates (e.g. divides) into two discrete layers consisting of a second aqueous phase 114 (conventionally known as the "rich electrolyte") and a second organic phase 116 (typically characterized as the "barren organic extractant" at this point in the process).

The second aqueous phase 114 contains the initial electrolyte solution 96 having the desired copper ions therein which were transferred (received) from the first organic phase 76. The second organic phase 116 comprises the initial organic extractant 56 lacking any appreciable or substantial amounts of copper ions therein (which were removed by the electrolyte solution 96 in the secondary containment vessel 94.) As illustrated in FIG. 2, the second organic phase 116 typically resides on top of the second aqueous phase 114 after settling is completed. Settling occurs within a settling chamber 120 which may be maintained separately from and in fluid communication with the secondary containment vessel 94 or formed integrally as part of the vessel 94. In a preferred embodiment, the settling chamber 120 is manufactured from the same materials listed above in connection with the secondary containment vessel 94 (and primary containment vessel 54).

Next, the second organic phase 116 is separated from the second aqueous phase 114. The term "separated" as used herein shall again involve a step in which the second organic phase 116 is removed from the second aqueous phase 114 so that both phases 114, 116 are isolated from each other and no longer together. It is not critical as to which phase 114, 116 is removed first from the settling chamber 120 with the initial removal of either phase 114, 116 being considered equivalent. Separation may be accomplished in a conventional manner as described above in connection with separation of the first organic phase 76 from the first aqueous phase 74. Specifically, separation can be achieved using a conventional weir system [not shown] positioned within the settling chamber 120.

At this stage, the second organic phase 116 will typically include a portion of the solid waste material 40 suspended therein in combination with a residual amount (not shown) of the second aqueous phase 114 (e.g. the electrolyte solution 96). Complete separation (isolation) of the second aqueous phase 114 and the second organic phase 116 from each other is again prevented by a variety of emulsification reactions which occur at the interface 122 between both phases 114, 116 within the settling chamber 120. These reactions are directly caused by the suspended solid waste material 40 in the system 50. In a typical processing system, the second organic phase 116 (after separation) will include about 90–99% by weight organic extractant 56, about 0.001–5% by weight solid waste material 40, and about 1–5% by weight residual second aqueous phase 114 (electrolyte solution 96). Likewise, the second aqueous phase 114 (after separation) will typically include about 90–99% by weight electrolyte solution 96 (containing the desired copper ions therein), about 1–5% by weight residual second organic phase 116 (e.g. organic extractant 56), and about 0.001–5% by weight solid waste material 40. However, the present invention shall not be limited to these numerical values which may vary substantially in view of the particular materials being treated, environmental conditions, and other operational factors.

As noted above, the solid waste material 40 in both phases 114, 116 causes a variety of physical and chemical interactions which prevent the phases 114, 116 from completely separating. A substantial amount of organic extractant 56 can therefore be lost within the second aqueous phase 114 when it is routed into the electrowinning stages of the system 50 for further processing (discussed below). To minimize these problems, it is a goal of the present invention to remove as much of the solid waste material 40 from the system 50 as possible. In the embodiment of FIG. 2, this goal is accomplished by treatment of at least part of the second organic phase 116 to remove excess solid waste material 40 therefrom. Removing even small amounts of solid waste material 40 will improve the degree of separation efficiency in the system 50 and will avoid excessive accumulation of the solid waste material 40 in the system 50 during continuous operation over a long time period.

Prior methods for removing solid waste matter of the type described above primarily involved treatment of the aqueous phases in the system 50 (especially the "rich electrolyte"). Conventional methods for accomplishing this goal included the use of complex flotation cells in combination with dual media anthracite and garnet (electrolyte) filter systems. Recovered organic materials (phases) were traditionally filtered using conventional bag filter systems. Standard treatment methods for removing solid waste matter are discussed in Gonzales, I., et al., "Toquepala-Cuajone Leach—Solvent Extraction—Electrowinning Project", paper (preprint no. 96–206) presented at the S.M.E. (Society of Mining Engineers) Annual Meeting at Phoenix, Ariz. (U.S.A.), Mar. 11–14, 1996. However, the disadvantages associated with these methods include (1) high space requirements; (2) high capital and operating costs; (3) incomplete solids removal; and (4) substantial operating time requirements.

In accordance with the claimed invention, a unique and highly efficient method is disclosed for removing a substantial portion of the solid waste material 40 from the second organic phase 116, followed by re-introduction of the "cleaned" second organic phase 116 into the system 50 for reuse. The removed solid waste material 40 is discarded, with such removal substantially improving the efficiency of the entire system 50 during long term, continuous operation. With reference to FIG. 2, at least a portion of the second organic phase 116 is treated to remove solid waste material 40 therefrom. In large scale systems, all of the second organic phase 116 may be treated as discussed below. However, in a preferred embodiment involving most production facilities, a portion of the second organic phase 116 (e.g. a "bleed stream") will be removed, treated, and reintroduced into the system 50. Whether all or part of the second organic phase 116 is processed, both of these alternatives shall be considered equivalent in accordance with the claimed invention.

As shown in FIG. 2, the second organic phase 116 is divided into a primary fraction 140 and a secondary fraction 142. In a preferred embodiment, the primary fraction 140 is removed from the second organic phase 116 via conduit 143 and in-line pump 144. The primary fraction 140 is then placed into a storage tank 146. Likewise, the secondary fraction 142 is removed from the second organic phase 116 via conduit 147 and in-line pump 148, followed by placement of the secondary fraction into a storage tank 149. While the respective sizes of the primary and secondary fractions 140, 142 will vary based on numerous system parameters, a representative embodiment will involve the removal of about 1–10% by weight of the second organic phase 116 as the primary fraction 140 and about 90–99% by weight of the second organic phase 116 as the secondary fraction 142. The secondary fraction 142 is thereafter transferred via conduit 150 and in-line pump 151 back to the primary containment vessel 54 for reuse in treating subsequent amounts of the copper-containing lixivant product 30 which enter the system 50.

The primary fraction 140 of the second organic phase 116 is then routed via conduit 152 and in-line pump 154 to a specialized filtration system 156 which includes at least one filtration membrane 160 having a plurality of pores 162 therethrough. The pores 162 are shown in enlarged format in FIG. 2 for the sake of clarity. Each of the pores 126 has a diameter sufficient to prevent passage of the solid waste material 40 through the membrane 160 while allowing passage of the primary fraction 140 of the second organic phase 116 (which consists of the organic extractant 56 and small amounts of residual electrolyte solution 96 as discussed above). The filtration membrane 160 is selected from the group consisting of a microfiltration membrane and an ultrafiltration membrane. In a preferred embodiment designed to achieve a maximum degree of separation efficiency, each of the pores 162 within the filtration membrane 160 will have a diameter of about 0.001–1.0 microns. However, the present invention shall not be limited to any particular numerical parameters in connection with the pores 162, with the above-listed range being provided for example purposes. Pore size parameters to be employed in a given situation will be determined using preliminary pilot studies on the specific materials being processed.

In accordance with the present invention, all of the pores 162 in the membrane 160 will be substantially equivalent in size, with each pore 162 having a preferred diameter within the range listed above. While even smaller pores 162 may be used, the foregoing diameter range is preferred since it allows filtration to occur at a sufficiently high membrane flux rate (e.g. about 10–30 GFD as discussed further below) to ensure efficient operation of the system 50. The term "membrane flux" as used herein is defined as the flow rate of materials through the membrane 160 as a function of the membrane area in, for example, gallons per $ft^2$ per day ("GFD").

In a preferred embodiment, the primary fraction 140 of the second organic phase 116 is delivered to the filtration membrane 160 at a flow rate of about 10–100 gallons per minute (GPM) using the pump 154. Membrane filters are entirely different from conventional mechanical filtration systems (e.g. drum-type filters, bag filters, dual media filters, pressure leaf devices, and the like) in structure, function, and capability. Modern filtration membranes typically involve a multi-porous membrane structure associated with a support apparatus. Many filtration membranes exist which are manufactured from a variety of materials ranging from polymeric plastic compositions to thin-layer ceramic products. In the claimed process, filtration membranes which are most suitable for use involve two specific categories, namely, (1) microfiltration membranes; and (2) ultrafiltration membranes. The pore size for a given membrane will vary, depending on which category is involved. Microfiltration membranes typically involve uniform pore diameters ranging from about 0.1–10 microns. They are generally capable of blocking the passage of small solid particles. Ultrafiltration membranes normally have pore diameters ranging from about 0.001–0.1 microns, and will block the passage of even smaller solid particles. The specific membrane to be selected for a given application will depend on the desired pore size. For example, the removal of particles associated with the solid waste material 40 having a diameter of 0.6 microns or more would involve the use of a 0.5 micron microfiltration membrane. In the present case, optimum results will be attained when a pore diameter of about 0.001–1.0 microns is employed. Either a microfiltration membrane or ultrafiltration membrane may be used as the membrane 160, with the selection of either membrane type depending on many factors including the desired output of the system 50 and the particular character of the solid waste material 40. Ultrafiltration and microfiltration membranes which are suitable for use in the claimed process as the filtration membrane 160 are commercially available from many sources, including but not limited to (A) Desalination Systems, Inc. of Vista, Calif. (U.S.A.)—product nos. K4040C, K8040C, and JX2540F; (B) Hydranautics, inc. of San Diego, Calif. (U.S.A.)—product no. NTU-2020-M7S; (C) Zenon Environmental Systems, inc. of Burlington, Ontario, Canada—product no. ZenoUF ZPF8-100; and (D) U.S. Pilter Corp. of Warrendale, Pa.—product no. 1P19-40. As previously noted, ultrafiltration and microfiltration membranes may be produced from a variety of different materials including polymeric plastic compositions and ceramic materials. In this regard, the present invention shall not be limited to any particular type of filtration membrane.

The claimed invention shall also not be restricted to any specific method for delivering the primary fraction 140 of the second organic phase 116 to the selected filtration membrane 160. For example, the primary fraction 140 may be delivered in a downward direction onto the upper surface 164 of the filtration membrane 160 (e.g. in a direction perpendicular to the longitudinal axis $A_1$ of the membrane 160 shown in FIG. 2). However, in a preferred embodiment, delivery of the primary fraction 140 of the second organic phase 116 to the membrane 160 will take place in a different manner. With reference to FIG. 2, the filtration membrane 160 includes a first end 166 and a second end 170. In the embodiment of FIG. 2, the primary fraction 140 is delivered to the first end 166 of the filtration membrane 160 so that it flows onto the filtration membrane 160 and travels across the upper surface 164 of the membrane 160 from the first end 166 to the second end 170. As a result, the primary fraction 140 of the second organic phase 116 will flow across the membrane 160 in a direction which is parallel to the longitudinal axis $A_1$ of the membrane 160. This particular procedure in which the primary fraction 140 flows continuously across the upper surface 164 of the filtration membrane 160 from the first end 166 to the second end 170 is known as "crossflow filtration". Crossflow filtration prevents cloggage of the pores 162 with the solid waste material 40. This is accomplished by the continuous "sweeping" action of the primary fraction 140 of the second organic phase 116 as it moves across the membrane 160. While the present invention shall not be limited to any particular rate at which the primary fraction 140 flows across the upper surface 164 of the membrane 160, it is preferred that the flow rate be equivalent to the rate at which the primary fraction 140 initially encounters the membrane 160 (e.g. about 10–100 GPM as noted above). Maintenance of this flow rate is accomplished by the pump 154.

While a planar (flat) filtration membrane 160 is illustrated in FIG. 2, this representation is schematic in nature with many different membrane types being suitable for use in the claimed process. To effectively accomplish crossflow filtration as discussed above, optimal results will be achieved if a cylindrical membrane cartridge unit is employed. A representative cylindrical membrane cartridge is schematically shown in FIG. 3 at reference number 180. This type of cartridge unit 180 is commercially available from many different sources, including Desalination Systems, Inc. of Vista, Calif. (U.S.A.) which sells such a product under the following designations: Type K (microfiltration) and Types E, F, G, J, Q, P, Y, and CA (ultrafiltration). Each cartridge unit 180 is typically about 40–45 inches long and about 4–8 inches in diameter, although these values may vary in accordance with the particular type of cartridge unit 180 under consideration. As shown in FIG. 3, each cartridge unit 180 includes a housing 182 having a first end 184 and a second end 186. The first end 184 and the second end 186 are both open so that fluids may pass entirely through the housing 182. In the center of the cartridge unit 180, an elongate conduit 190 is provided which includes a plurality of openings 191 therethrough. Surrounding the conduit 190 are multiple, spirally-wound layers 192 of membrane-type filter material which, in most cases, involves a selected organic composition of proprietary design. Also associated with the layers 192 of filter material are layers 194 of a porous spacer material (e.g. a proprietary plastic/polymer mesh) and layers 196 of a membrane backing composition (e.g. preferably manufactured from a non-porous plastic product). However, the specific layers of material, the type of layers which are used, and the arrangement of the layers will vary from one commercial product to another, with the schematically illustrated arrangement of layers in FIG. 3 being provided for example purposes.

To use the cartridge unit 180 in the claimed process, the primary fraction 140 of the second organic phase 116 enters the first end 184 of the cartridge unit 180 in the direction of arrow "X". The primary fraction 140 is not allowed to enter the elongate conduit 190 which is designed to receive filtered permeate (described below). As a result, the incoming fluid passes between and through the layers 192 of filter material. Liquid passing through each layer 192 of filter material (e.g. the "permeate" as discussed below) comes in contact with an adjacent layer 196 of backing material. Each layer 196 of backing material is of a type which prevents the permeate from passing therethrough. The layers 196 of backing material cause the permeate to flow in a spiral, inward manner toward the center of the cartridge unit 180 where it comes in contact with the conduit 190. The permeate ultimately enters the conduit 190 through the openings 191. It should be noted that the permeate flows inwardly toward the conduit 190 in the direction of arrow "Y" which is perpendicular to the direction in which the primary fraction 140 enters the cartridge unit 180. As indicated above, the primary fraction 140 of the second organic phase 116 enters the cartridge unit 180 in the direction of arrow "X" which also constitutes the longitudinal axis of the cartridge unit 180.

After entering the conduit 190, the permeate flows therethrough and leaves the cartridge unit 180 at the second end 186 in the direction of arrow "P". In contrast, the solid waste material 40 which did not pass through the layers 192 of filter material (e.g. the "retentate" as discussed below) continues to flow across the layers 192 and leaves the cartridge unit 180 at the second end 186 in the direction of arrow "R". Both the retentate and the permeate may then be separately collected and further treated/processed as desired.

The claimed invention shall not be limited to any particular design associated with the filtration membrane 160 (and cartridge unit 180). Representative cartridge-type ultrafiltration and microfiltration units which may be employed in the process of FIG. 2 are listed above. While a single filtration membrane 160 is shown schematically in FIG. 2, multiple membranes 160 (e.g. multiple cartridge units 180) may be used either in series or parallel with each other. The selection of a particular arrangement or number of filtration membranes 160 will depend on numerous factors including the specific nature of the materials being processed, the type and character of solid waste material 40 under consideration, the overall size of the treatment system, and its desired output. However, in a representative, non-limiting example involving the system 50 of FIG. 2, if 10,000 gallons of the second organic phase 116 containing about 0.001–5% by weight solid waste material 40 are to be treated at a desired flow (feed) rate of about 100 GPM, effective filtration will occur if 30 cylindrical ultrafiltration cartridge units 180 made by Desalination Systems, Inc. of Vista, Calif. (U.S.A.) —[product no. K8040C] are used in an arrangement where some cartridge units are maintained in series and some in parallel. For example, in a representative embodiment, the filtration system may consist of three parallel groups of cartridge units, with each group consisting of six cartridges in series. Next, in fluid communication with this arrangement of cartridge units and downstream therefrom are three more parallel groups of cartridge units, with each group consisting of four cartridges in series (making a total of 30 units.) It should also be noted that, while the above example involves a "batch" system, "continuous" flow systems may likewise be used in the same manner. Each cartridge unit 180 will be about 40 inches long and about 8 inches in diameter; with a pore size of 0.01 microns.

To process the primary fraction 140 of the second organic phase 116, it is delivered to the filtration membrane 160 at the flow rate listed above so that it flows onto the membrane 160. As a result, a permeate 200 is generated which passes through the membrane 160 at an optimum flux rate (defined above) of about 10–30 GFD. A retentate 202 is likewise produced which does not pass through the membrane 160. The retentate consists of the solid waste material 40, with the permeate 200 comprising a supply of recovered (cleaned) organic extractant 204 lacking the solid waste material 40 therein. The permeate also includes a very small amount of recovered electrolyte solution 96 (not shown). In a typical embodiment, the permeate 200 will consist of about 95–99% by weight recovered organic extractant 204 and about 1–5% by weight recovered electrolyte solution 96.

The recovered organic extractant 204 is thereafter transferred back to the primary containment vessel 54 for use in treating subsequent amounts of the copper-containing lixivant product 30 which later enter the system 50. In a preferred embodiment, transfer of the recovered organic extractant 204 back to the primary containment vessel 54 is accomplished by first delivering the entire permeate 200 (e.g. the recovered organic extractant 204 plus the small amount of recovered electrolyte solution 96) to the secondary containment vessel 94 using conduit 210 and in-line pump 212. The permeate 200 will then combine with the materials therein (e.g. the chemical mixture 113 consisting of the first organic phase 76 and the main supply of electrolyte solution 96). However, recombination of the permeate 200 with these compositions in the secondary containment vessel 94 will not include the solid waste material 40 previously removed from the system 50 as the retentate 202. The recovered organic extractant 204 (e.g. the permeate 200) will then be processed along with the chemical mixture 113 as discussed above and will ultimately combine with the second organic phase 116. Since part of the second organic phase 116 (e.g. the secondary fraction 142 as shown in FIG. 2) is subsequently transferred back to the primary containment vessel 54 for reuse, at least a portion of the recovered organic extractant 204 is likewise routed in combination with the secondary fraction 142 back to the primary containment vessel 54 via conduit 150. As a result, the organic components of the membrane permeate 200 (e.g. the supply of recovered organic extractant 204) can be transferred back to the primary containment vessel 54 for reuse in treating subsequent amounts of the copper-containing lixivant product 30. It should also be noted that the small amount of recovered electrolyte solution 96 within the permeate 200 will combine with the second aqueous phase 114 in the settling chamber 120 which is then isolated (separated) from the second organic phase 116 as indicated above.

An alternative procedure for transferring the recovered organic extractant 204 back to the primary containment vessel 54 is illustrated in dashed lines in FIG. 2. Specifically, transfer of the recovered organic extractant 204 to the primary containment vessel 54 can be accomplished by passing the permeate 200 into an auxiliary settling tank 222 via conduit 224 and in-line pump 226. The recovered organic extractant 204 and recovered electrolyte solution 206 will then separate in a substantially instantaneous manner within the auxiliary settling tank 222 due to substantial polarity differences and other physical dissimilarities. The recovered organic extractant 204 (which will reside on top within the settling tank 222) can then be removed from the tank 222 by conventional methods (e.g. the use of a standard weir system [not shown] within the tank 222 or other standard procedures). After removal, the recovered organic extractant 204 is routed via conduit 230 and in-line pump 234 directly into conduit 150 illustrated in FIG. 2. The recovered organic extractant 204 can then be transferred via conduit 150 (and pump 151) back to the primary containment vessel 54 for reuse therein. The recovered electrolyte solution 206 can be removed from the auxiliary settling tank 222 by the same conventional methods described above and routed via conduit 236 and in-line pump 240 into the secondary containment vessel 94 for reuse therein along with fresh electrolyte solution 96. Both of these methods accomplish the same goal, namely, transfer of the recovered organic extractant 204 back to the primary containment vessel 54. For this reason, both of the alternative procedures described above shall be considered equivalent.

Use of the method illustrated in FIG. 2 eliminates a substantial amount of the solid waste material 40 from the system 50. In a typical and representative embodiment, about 70–90% of the solid waste material 40 in the system 50 can be removed using the claimed method. However, the exact amount of solid waste material 40 which is actually removed from the system 50 is dependent on many factors including the operational parameters of the system 50, the extent of contamination in the various organic and aqueous phases, and other considerations. Regardless of the amount of solid waste material 40 removed in accordance with the claimed process, any reduction in solid waste material 40 will provide numerous benefits. For example, a decrease in solid waste material 40 within the system 50 (which is designed to operate on a continuous basis) will enable organic extractant compositions to be reused while avoiding re-introduction of the solid waste material 40 back into the system 50 during recycling. As a result, the level of solid waste material 40 in the system 50 will be controlled, thereby enabling subsequent phase separations to occur in a more complete manner. improved phase separation efficiency will minimize organic extractant carry-over into the various aqueous phases in the system 50 so that organic extractant losses are reduced.

If the level of solid waste material 40 is not controlled using the procedure described above, it will continuously increase in the system 50, thereby requiring excessive maintenance, cleaning and down-time. Furthermore, by controlling the level of solid waste material 40 in the system 50, less waste matter will be transferred to the electrowinning stages. The presence of solid waste material 40 in the electrowinning stages of the claimed process can substantially reduce current efficiency and decrease copper purity levels as noted above. By continuously removing even small amounts of the solid waste material 40 from the second organic phase 116 as described above, a copper product of improved purity can be generated. All of these benefits are achieved using membrane filtration technology which is highly effective in separating the materials of concern. For these reasons, this embodiment of the claimed invention represents an advance in the art of copper processing.

Before proceeding to the final step in the reaction process, it should be noted that fresh supplies of organic extractant 56 and electrolyte solution 96 will periodically be introduced into the system 50 to account for evaporative losses and the like. These fresh supplies may consist of fresh electrolyte solution 96 from the storage tank 104 (FIG. 2) and fresh organic extractant 56 from the storage tank 64. The amount of fresh reagents to be added (as well as the timing associated with reagent addition) will vary in accordance with the size of the system 50 and other operational parameters as determined by periodic monitoring to ensure that proper reagent levels are maintained. Finally, the second aqueous phase 114 (which contains the desired copper ions and is again characterized as the "rich electrolyte") is transferred via conduit 242 and in-pump 244 into a conventional electrowinning apparatus 250. Electrowinning is a well-known process as discussed in Krishman, E. R. et al., *Recovery of Metals from Sludges and Wastewaters*, Noyes Data Corporation, New Jersey, pp. 38–46 (1993) which is likewise incorporated herein by reference. Basically, within the electrowinning apparatus 250, the second aqueous phase 114 is placed in contact with at least one cathode 252 and at least one anode 254, followed by the application of electricity to the second aqueous phase 114 from a conventional power supply 256. This process causes copper from the second aqueous phase 114 to be plated directly onto the cathode 252 in elemental form, thereby completing the copper recovery process. With reference to FIG. 2, elemental copper plated onto the cathode 252 is schematically illustrated at reference number 260. In an actual production environment, the electrowinning process takes place within a "tank house" typically comprising 150–200 "cells" made of polymer concrete (e.g. vinyl ester resin-based concrete), with each cell containing 50–70 anodes (preferably made of lead) and 50–70 corresponding cathodes (typically produced from stainless steel). Electrowinning cells/systems of this type are commercially available from many sources including Ancor, Inc. of Chile. Each electrowinning cell normally has a valve-controlled feed line system which supplies copper ion-containing electrolyte materials (e.g. the second aqueous phase 114) to a manifold (not shown) at the bottom of the cell. The manifold includes multiple openings for even distribution of the electrolyte materials. A representative electrical current density in a typical electrowinning system of the type described above is about 260 amps/m$^2$. However, the present invention shall not be limited to any particular electrowinning apparatus or operational parameters, with a number of different conventional systems being suitable for use in accordance with the present invention.

As noted above, the presence of excessive solid waste material 40 in the second aqueous phase 114 (e.g. the "rich electrolyte") can adversely interfere with the electrowinning process. Large quantities of solid waste material 40 within the second aqueous phase 114 can cause decreased current efficiency in the electrowinning unit 250 and a reduction in purity of the plated elemental copper 260. While the second aqueous phase 114 will contain a certain amount of the solid waste material 40, removal of the waste material 40 from the second organic phase 116 and recirculation of the "cleaned" (recovered) organic extractant 204 will produce an overall reduction in the amount of solid waste material 40 in the entire system 50. Such a reduction during long-term, continuous operation of the system 50 will enable less of the solid waste material 40 to ultimately enter the electrowinning apparatus 250. As a result, increases in current efficiency of about 1–5% can be achieved compared with conventional systems. This increase reduces energy consumption and generates a final copper product with lower contaminant levels.

Finally, the treated electrolyte solution 262 which remains after copper ion removal can be discarded or recycled back to the secondary containment vessel 94 via conduit 264 and in-line pump 266 for reuse therein as the electrolyte solution 96.

C. TREATMENT OF THE LIXIVANT PRODUCT TO RECOVER COPPER IONS—SECOND EMBODIMENT

In accordance with a second embodiment of the present invention (FIG. 4), the copper-containing lixivant product 30 is again treated with an organic extractant, followed by a series of phase separations and electrowinning to produce a purified elemental copper product. As in the first embodiment described above, the organic extractant is processed during this procedure to remove at least part of the solid waste material 40 therefrom. However, processing of the organic extractant occurs at a different stage compared with the first embodiment. Removal of any solid waste material 40 from the system 50 during continuous operation again provides many benefits ranging from increased electrowinning efficiency to more effective utilization of the organic extractant.

To remove at least part of the solid waste material 40 in the embodiment of FIG. 4, a number of specific steps are taken in a specialized treatment system illustrated schematically in FIG. 4 at reference number 300. All of the components, materials, structures, and elements associated with system 50 in the embodiment of FIG. 2 are applicable to system 300 unless otherwise noted. The use of common reference numbers in FIGS. 2 and 4 will indicate that the same components are applicable to both embodiments.

With reference to FIG. 4, the copper-containing lixivant product 30 ("pregnant leach solution") is transferred via conduit 51 and in-line pump 52 to the primary containment vessel 54. Within the primary containment vessel 52, the copper-containing lixivant product 30 is combined with the selected organic extractant 56 which is delivered to the primary containment vessel 54 via conduit 60 and in-line pump 62. At this stage, the organic extractant 56 typically lacks any appreciable or substantial amounts of copper ions therein and is normally known as the "barren organic extractant". Specifically, if fresh (unused) organic extractant 56 is employed, it will contain substantially no copper ions. If the organic extractant 56 consists of recycled materials (discussed below) it will typically have some residual copper ions therein which are left over from prior processes as discussed below. The organic extractant 56 (which is retained within storage tank 64) is described above in connection with the embodiment of FIG. 2, with the organic extractant 56 being the same in the embodiments of FIGS. 2 and 4.

Combination of the organic extractant 56 with the copper-containing lixivant product 30 will take place directly within the primary containment vessel 54 as previously indicated. In a preferred embodiment, the lixivant product 30 will be combined with the organic extractant 56 in a lixivant product 30: organic extractant 56 volume ratio range of about 30–70:70–30. However, the claimed invention shall not be limited to these parameters, with the particular amount of organic extractant 56 to be used in a given situation being determined by routine preliminary testing. The organic extractant 56 and the lixivant product 30 are mixed within the primary containment vessel 54 using the motor-driven agitator system consisting of multiple mixing blades 66 and motor unit 70. Mixing in this manner typically occurs over a time period of about 5–30 minutes. As a result, a mixed liquid product 72 is generated within the primary containment vessel 54. In view of significant polarity differences between the various materials within the mixed liquid product 72, the mixed liquid product 72 spontaneously gravitates (divides) after mixing into two discrete layers consisting of the first aqueous phase 74 (the "raffinate") and the first organic phase 76 (the "loaded organic extractant") as discussed above. The first aqueous phase 74 will contain the initial chemical lixivant 20 lacking any appreciable or substantial amounts of the copper ions which were previously dissolved therein (e.g. within the lixivant product 30), with the first organic phase 76 containing the organic extractant 56 in combination with the copper ions transferred from the lixivant product 30. As noted above, the first aqueous phase 74 will typically contain some residual copper ions therein due to inherent limitations in all liquid-liquid extraction systems which prevent 100% recovery (extraction) from taking place.

With continued reference to FIG. 4 the first organic phase 76 will typically reside on top of the first aqueous phase 74. This process occurs rapidly (e.g. in a substantially instantaneous manner) within the settling chamber 80 (described above) which may be maintained separately and in fluid communication with the primary containment vessel 54 or formed integrally as part of the primary containment vessel 54.

Next, the first organic phase 76 is separated from the first aqueous phase 74. The term "separated" as used herein shall again involve a step in which the first organic phase 76 is removed from the first aqueous phase 74 so that both phases 74, 76 are isolated from each other and no longer together. It is not critical as to which phase 74, 76 is removed first from the settling chamber 80 with the initial removal of either phase 74, 76 being considered equivalent. As previously noted, separation may be accomplished in a conventional manner (e.g. by the use of a standard weir system [not shown] within the settling chamber 80).

As shown in FIG. 4, both the first aqueous phase 74 and the first organic phase 76 will include a portion of the solid waste material 40 suspended therein. The nature and content of the solid waste material 40 is discussed above. The first aqueous phase 74 is either discarded, stored for future use, or immediately reused on additional amounts of rock 12 (ore). If immediate reuse is desired, the first aqueous phase 74 is transferred via conduit 82 and in-line pump 84 back to the pile 14 of rock 12 for use in removing additional amounts of copper during continuous operation of the system 300. Since the first aqueous phase 74 is typically reused in this manner, the presence of any solid waste material 40 therein is of minimal consequence.

After separation, the first organic phase 76 is retained for further treatment in accordance with the embodiment of FIG. 4. As discussed above, the first organic phase 76 will typically include a portion of the solid waste material 40 suspended therein along with a residual amount (not shown) of the first aqueous phase 74 (e.g. the chemical lixivant 20). Complete removal of the first aqueous phase 74 from the first organic phase 76 is hindered by a variety of emulsification reactions which occur at the interface 86 between both phases 74, 76. These reactions are primarily caused by the suspended solid waste material 40 in both phases. In a typical processing system, the first organic phase 76 (after separation from the first aqueous phase 74) will again include about 90–99% by weight organic extractant 56 (containing copper ions therein), about 0.001–5% by weight solid waste material 40, and about 1–5% by weight residual first aqueous phase 74 (lixivant 20). Likewise, the first aqueous phase 74 (after separation) will include about 90–99% by weight lixivant 20, about 0.001–5% by weight solid waste material 40, and about 1–5% by weight residual first organic phase 76 (organic extractant 56). However, the claimed invention shall not be limited to these numerical values which may vary substantially in view of the particular materials being treated, environmental conditions, and other operational factors.

The presence of even small amounts of solid waste material 40 in the various phases of the system 300 can create numerous problems including reduced current efficiency in the electrowinning stages and incomplete phase separations. For example, as previously discussed, the presence of solid waste material 40 within the first aqueous phase 74 will cause a residual amount of the first organic phase 76 (e.g. the organic extractant 56) to be carried over into the first aqueous phase 74. As a result, some of the organic extractant 56 is lost during separation of the first aqueous phase 74 and the first organic phase 76. This embodiment of the present invention is designed to remove at least part of the solid waste material 40 from the system 300 so that phase separation efficiency is improved.

With continued reference to FIG. 4, the first organic phase 76 (e.g. the "loaded organic extractant") is divided into a primary fraction 302 and a secondary fraction 304. In the representative embodiment of FIG. 4, the primary fraction 302 is obtained by routing about 1–10% by weight of the first organic phase 76 into a storage tank 306 using conduit 310 and in-line pump 312. Likewise; to obtain the secondary fraction 304, about 90–99% by weight of the first organic phase 76 is routed into a storage tank 314 using conduit 316 and in-line pump 320. The primary fraction 302 is then treated as discussed below to remove the solid waste material 40 therefrom. Specifically, the primary fraction 302 is transferred via conduit 322 and in-line pump 324 to a specialized filtration system 326 of the same type as filtration system 156. All of the information provided above concerning the filtration system 156 shall be incorporated by reference in this section of the present description. However, for the sake of clarity and completeness, a detailed discussion of the filtration system 326 will be provided.

The filtration system 326 specifically includes at least one filtration membrane 330 having a plurality of pores 334 therethrough. The pores 334 are shown in enlarged format in FIG. 4. Each of the pores 334 has a diameter sufficient to prevent passage of the solid waste material 40 through the membrane 330 while allowing passage of the primary fraction 302 of the first organic phase 76. As noted above, the primary fraction 302 of the first organic phase 76 includes the organic extractant 56 and residual amounts of the first aqueous phase 74 (lixivant 20), along with the solid waste material 40. The filtration membrane 330 is again selected from the group consisting of a microfiltration membrane and an ultrafiltration membrane. In a preferred embodiment designed to achieve a maximum degree of separation efficiency, each of the pores 334 in the selected filtration membrane 300 will have a diameter of about 0.001–1.0 microns as previously discussed in connection with filtration membrane 160. However; this embodiment of the present invention shall not be limited to any particular numerical parameters in connection with the pores 334, with the above-listed range being provided for example purposes. Pore size parameters to be employed in a given situation will be determined using preliminary pilot studies on the specific materials being processed.

In accordance with the claimed method, all of the pores 334 in the membrane 330 are substantially equivalent in size, with each pore 334 having a diameter within the range listed above. While even smaller pores 334 may be employed, the 0.001–1.0 micron diameter range is preferred since it allows filtration to occur at a sufficiently high flux rate (e.g. about 10–30 GFD) to ensure efficient system operation.

In a preferred embodiment, the primary fraction 302 of the first organic phase 76 is delivered to the filtration membrane 330 at a flow rate of about 10–100 gallons per minute (GPM) using the pump 324. As indicated above, membrane filters are entirely different from conventional mechanical filtration systems (e.g. drum-type filters, bag filters, dual media filters, pressure leaf devices, and the like) in structure, function, and capability. Modern filtration membranes typically comprise a multi-porous membrane structure associated with a support apparatus. Many filtration membranes exist which are manufactured from a variety of materials ranging from polymeric plastic compositions to thin-layer ceramic products.

Preferred filtration membranes suitable for use in the process of FIG. 4 again involve two specific categories, namely, (1) microfiltration membranes; and (2) ultrafiltration membranes. Technical information regarding these membranes, as well as commercial membrane sources are discussed above in the embodiment of FIG. 2, with such information being equally applicable in the present embodiment. Either a microfiltration membrane or ultrafiltration membrane may be used as the membrane 330, with the selection of either membrane type depending on many factors including the desired output of the system 300 and the particular character of the solid waste material 40 as determined by preliminary analysis.

The embodiment of FIG. 4 shall also not be limited to any particular method for delivering the primary fraction 302 of the first organic phase 76 to the filtration membrane 330. For example, the primary fraction 302 may be delivered in a downward direction onto the upper surface 336 of the filtration membrane 330 (e.g. in a direction perpendicular to the longitudinal axis $B_1$ of the membrane 330 shown in FIG. 4). However, in a preferred embodiment, delivery of the primary fraction 302 of the first organic phase 76 to the membrane 330 will take place in a different manner. With reference to FIG. 4, the filtration membrane 330 includes a first end 340 and a second end 342. In the embodiment of FIG. 4, the primary fraction 302 is delivered to the first end 340 of the filtration membrane 330 so that it flows onto the membrane 330 and travels across the upper surface 336 from the first end 340 to the second end 342. As a result, the primary fraction 302 of the first organic phase 76 will flow across the membrane 330 in a direction which is parallel to the longitudinal axis $B_1$. This procedure in which the primary fraction 302 flows continuously across the upper surface 336 of the filtration membrane 330 from the first end 340 to the second end 342 is known as "crossflow filtration" as discussed above in connection with membrane 160. Crossflow filtration prevents cloggage of the pores 334 with the solid waste material 40. This is accomplished by the continuous "sweeping" action of the primary fraction 302 of the first organic phase 76 as it moves across the membrane 330. While the present invention shall not be limited to any particular rate at which the primary fraction 302 flows across the upper surface 336 of the membrane 330, it is preferred that the flow rate be equivalent to the rate at which the primary fraction 302 initially encounters the membrane 330 (e.g. about 10–100 GPM as noted above). Maintenance of this flow rate is accomplished by the pump 324.

While a planar (flat) filtration membrane 330 is illustrated in FIG. 4, this representation is schematic in nature with many different membrane types being suitable for use in the claimed process. To effectively accomplish crossflow filtration, optimal results will be achieved if a cylindrical membrane cartridge unit is employed. A representative cylindrical membrane cartridge is schematically illustrated in FIG. 3 at reference number 180. All of the information provided above in the embodiment of FIG. 2 involving cartridge unit 180 is equally applicable to the embodiment of FIG. 4.

Even though a single filtration membrane 330 is shown schematically in FIG. 4, multiple membranes 330 (e.g. multiple cartridge units 180) may be used in series or parallel with each other. The selection of a particular arrangement or number of filtration membranes 330 will depend on numerous factors including the specific nature of the materials being processed, the type and character of the solid waste material 40 under consideration, the overall size of the treatment system, and its desired output. However, in a representative, non-limiting example involving system 300, if 10,000 gallons of the first organic phase 76 containing about 0.001–5% by weight solid waste material 40 are to be treated at a desired flow (feed) rate of about 100 GPM, effective filtration will occur if 30 cylindrical ultrafiltration cartridge units 180 made by Desalination Systems, Inc. of Vista, Calif. (U.S.A.)—[product no. K8040C] are used in an arrangement where some cartridge units are maintained in series and some in parallel. For example, in a representative embodiment, the above system may consist of three parallel groups of cartridge units, with each group consisting of six cartridges in series. Next, in fluid communication with this arrangement of cartridge units and downstream therefrom are three more parallel groups of cartridge units, with each group consisting of four cartridges in series (making a total of 30 units.) It should also be noted that, while the above example involves a "batch" system, "continuous" flow systems may likewise be used in the same manner. Each cartridge unit 180 will be about 40 inches long and about 8 inches in diameter, with a pore size of 0.01 microns.

To process the primary fraction 302 of the first organic phase 76, it is delivered to the filtration membrane 330 at the flow rate indicated above so that it flows onto the membrane 330. As a result, a permeate 350 is generated which passes through the membrane 330 at an optimum flux rate of about 10–30 GFD. A retentate 352 is likewise produced which does not pass through the membrane 330. The retentate 352 consists of the solid waste material 40, with the permeate 350 comprising a supply of recovered (cleaned) organic extractant 354 lacking the suspended solid waste material 40 therein. The permeate 350 also includes a small amount of recovered lixivant 20 (not shown) derived from the first aqueous phase 74. In a typical embodiment, the permeate 350 will consist of about 95–99% by weight recovered organic extractant 354 and about 1–5% by weight recovered lixivant 20.

The recovered organic extractant 354 is thereafter transferred back to the primary containment vessel 54 for use in treating subsequent amounts of the copper-containing lixivant product 30 which enter the system 300. Transfer of the recovered organic extractant 354 to the primary containment vessel 54 is accomplished by delivering the entire permeate 350 to the primary containment vessel 54 using conduit 360 and in-line pump 362. The permeate 350 will then combine with the materials therein (e.g. incoming amounts of the lixivant product 30 and fresh organic extractant 56 which form the mixed liquid product 72). However, recombination of the permeate 350 with these compositions in the primary containment vessel 54 will not include the solid waste material 40 removed from the system 300 as the retentate 352. Not only does this process effectively conserve and reuse the organic extractant 56, but it also removes solid waste material 40 in a continuous manner which prevents excessive accumulation of the solid waste material 40 in the system 300. Finally, the small amount of recovered lixivant 20 within the permeate 350 will combine with the lixivant product 30 in the primary containment vessel 54 due to common polarity characteristics. Both of these materials (in combination) are then separated from the first organic phase 76 in the manner discussed above.

In the embodiment of FIG. 4 as previously described, the first organic phase 76 is divided into the primary and secondary fractions 302, 304, with the primary fraction 302 undergoing treatment to remove the solid waste material 40 therefrom. In large scale systems, all of the first organic phase 76 may be passed through the filtration membrane 330, with the membrane permeate being directly transferred into subsequent stages of the system 300 for processing without initial recycling to the primary containment vessel 54. However, in most production facilities, the procedure shown in FIG. 4 is preferred. Whether all or part of the first organic phase 76 is processed (e.g. filtered by the membrane 330), both of these alternatives shall be considered equivalent in accordance with the claimed invention.

With continued reference to FIG. 4, the secondary (unfiltered) fraction 304 of the first organic phase 76 is then routed via conduit 90 and in-line pump 92 into the secondary containment vessel 94 for treatment and electrowinning using the same steps, procedures, and materials discussed above in connection with the first organic phase 76 in the embodiment of FIG. 2. Accordingly, all of the procedures which are used to treat the first organic phase 76 and obtain a purified copper product 260 in the system 50 are incorporated by reference in this section of the present description. The only difference of consequence between the systems 50, 300 at this stage is the elimination in system 300 of the procedures illustrated in FIG. 2 which are used to treat (e.g. filter) the second organic phase 116. While these steps are not shown in FIG. 4 and are not necessary in the embodiment of FIG. 4, they nonetheless may be used in combination with the steps listed above to produce a dual filtration system involving filtration membranes 160 and 330. Membrane filtration of the second organic phase 116 in the system of FIG. 4 (e.g. the addition of membrane 160) is discretionary and may be employed if needed based on preliminary experimentation. If used, filtration of the second organic phase 116 will proceed in the manner described above. If not used, the entire second organic phase 116 is simply transferred after separation from the second aqueous phase 114 back to the primary containment vessel 54 for reuse via conduit 370 and in-line pump 372 (FIG. 4).

Use of the process associated with FIG. 4 eliminates a substantial amount of the solid waste material 40 from the system 300. In a typical and representative embodiment, about 70–90% of the solid waste material 40 in the system 300 can be removed using the claimed method. However, the exact amount of solid waste material 40 actually removed from the system 300 is dependent on many factors including the operational parameters of the system, the extent of contamination in the various organic and aqueous phases, and other considerations. Regardless of the amount of solid waste material 40 removed in accordance with the claimed process, any reduction in solid waste material 40 will provide numerous benefits. For example, a decrease in solid waste material 40 within the system 300 (which is designed to operate on a continuous basis) will enable organic extractants to be reused while avoiding re-introduction of the solid waste material 40 into the system 300 during recycling. As a result, the level of solid waste material 40 in the system 300 is controlled, thereby enabling subsequent phase separations to occur in a more complete manner. Improved phase separation efficiency will minimize organic extractant carry-over into the various aqueous phases in the system 300 so that organic extractant losses are reduced. Likewise, reduction of the solid waste material 40 in the system 300 will improve electrowinning efficiency to the same extent discussed above in the embodiment of FIG. 2.

If the level of solid waste material 40 is not controlled using the foregoing procedure, it will continuously increase in the system 300, thereby requiring excessive maintenance, cleaning, and down-time. Furthermore, by controlling the level of solid waste material 40 in the system 300, less waste matter will be transferred to the electrowinning stages. The presence of solid waste material 40 in the electrowinning stages of the claimed process can substantially reduce current efficiency and decrease copper purity levels as noted above. By continuously removing the solid waste material 40 from the first organic phase 76 as described above, a copper product of improved purity can be generated. All of these benefits are achieved using membrane filtration technology which is highly effective in separating the materials of concern. For these reasons, this embodiment of the claimed invention represents an advance in the art of copper processing.

The present invention satisfies a long-felt need for an SX/EW system which controls operational losses of organic extractants and is capable of the improved isolation of desired components. Electrowinning and copper recovery can proceed with a maximum degree of efficiency in order to generate increased amounts of high purity copper. In particular, the claimed process provides the following benefits compared with conventional SX/EW systems: (A) improved phase separation efficiency which minimizes losses of organic extractants; (B) a considerable reduction in the solid waste content of the various phases in the system which reduces system maintenance and down-time; (C) improved current efficiency in the electrowinning stages of the process; and (D) the production of a high-purity copper product with a minimal number of production steps. All of these goals are achieved by membrane filtration of the various organic phases in the system which represents a new and unique development in the copper processing field.

Having herein described preferred embodiments of the present invention, it is anticipated that suitable modifications can be made thereto by individuals skilled in the relevant art which remain within the scope of the invention. For example, the invention shall not be limited to any particular structures, components, and hardware in connection with the claimed process. Likewise, operating parameters associated with the systems 300 may be varied as necessary to produce desired results. The present invention shall therefore only be construed in accordance with the following claims:

The invention that is claimed is:

1. A method for recovering copper from copper ore comprising the steps of:

providing a supply of copper ore;

placing said copper ore in contact with a lixivant solution, said lixivant solution extracting copper ions from said ore to produce a lixivant product comprising said lixivant solution in combination with said copper ions, said lixivant product further comprising at least one solid waste material therein;

combining said lixivant product with an organic extractant in a primary containment vessel to generate a mixed liquid product therein comprising a first aqueous phase and a first organic phase, said first organic phase comprising said organic extractant in combination with said copper ions, and said first aqueous phase comprising said lixivant solution;

separating said first organic phase from said first aqueous phase;

combining said first organic phase with an electrolyte solution in a secondary containment vessel to generate a chemical mixture comprising a second aqueous phase and a second organic phase, said second aqueous phase comprising said electrolyte solution in combination with said copper ions, and said second organic phase comprising said organic extractant and at least a portion of said solid waste material originally obtained from said lixivant product;

separating said second organic phase from said second aqueous phase;

delivering at least a portion of said second organic phase to at least one filtration membrane comprising a plurality of pores therethrough, each of said pores through said filtration membrane having a diameter sufficient to prevent passage of said solid waste material therethrough while allowing passage of said organic extractant, said portion of said second organic phase flowing onto said filtration membrane in order to produce a permeate which passes through said filtration membrane and a retentate which does not pass through said filtration membrane, said retentate comprising said solid waste material and said permeate comprising a recovered supply of organic extractant;

transferring said recovered supply of organic extractant to said primary containment vessel for reuse therein in treating subsequent amounts of said lixivant product;

placing said second aqueous phase in contact with an anode and a cathode; and applying electricity to said second aqueous phase, said electricity causing said copper ions within said second aqueous phase to be removed therefrom and plated onto said cathode as metallic copper.

2. The method of claim 1 wherein said filtration membrane is selected from the group consisting of a microfiltration membrane and an ultrafiltration membrane.

3. The method of claim 1 wherein each of said pores through said filtration membrane has a diameter of about 0.001–1.0 microns.

4. The method of claim 1 wherein said permeate passes through said filtration membrane at a membrane flux rate of about 10–30 GFD.

5. The method of claim 1 wherein said filtration membrane further comprises a first end and a second end, and said delivering of said portion of said second organic phase to said filtration membrane comprises supplying said portion of said second organic phase to said first end of said filtration membrane so that said portion of said second organic phase flows onto said filtration membrane and travels across said filtration membrane from said first end to said second end in order to produce said permeate and said retentate during movement of said portion of said second organic phase across said filtration membrane, said retentate leaving said filtration membrane at said second end thereof, said movement of said portion of said second organic phase across said filtration membrane from said first end to said second end preventing cloggage of said pores in said filtration membrane.

6. The method of claim 1 wherein said organic extractant comprises at least one hydroxyphenyl oxime.

7. The method of claim 1 wherein said electrolyte solution comprises sulfuric acid.

8. A method for recovering copper from copper ore comprising the steps of:

providing a supply of copper ore;

placing said copper ore in contact with a lixivant solution, said lixivant solution extracting copper ions from said ore to produce a lixivant product comprising said lixivant solution in combination with said copper ions, said lixivant product further comprising at least one solid waste material therein;

combining said lixivant product with an organic extractant in a primary containment vessel to generate a mixed liquid product therein comprising a first aqueous phase and a first organic phase, said first organic phase comprising said organic extractant in combination with said copper ions, and said first aqueous phase comprising said lixivant solution;

separating said first organic phase from said first aqueous phase;

combining said first organic phase with an electrolyte solution in a secondary containment vessel to generate a chemical mixture comprising a second aqueous phase and a second organic phase, said second aqueous phase comprising said electrolyte solution in combination with said copper ions, and said second organic phase comprising said organic extractant and at least a portion of said solid waste material originally obtained from said lixivant product;

separating said second organic phase from said second aqueous phase; and delivering at least a portion of said second organic phase to at least one filtration membrane comprising a plurality of pores therethrough, each of said pores through said filtration membrane having a diameter sufficient to prevent passage of said solid waste material therethrough while allowing passage of said organic extractant, said portion of said second organic phase flowing onto said filtration membrane in order to produce a permeate which passes through said filtration membrane and a retentate which does not pass through said filtration membrane, said retentate comprising said solid waste material and said permeate comprising a recovered supply of organic extractant.

9. The method of claim 8 wherein said filtration membrane is selected from the group consisting of a microfiltration membrane and an ultrafiltration membrane.

10. A method for recovering copper from copper ore comprising the steps of:

providing a supply of copper ore;

placing said copper ore in contact with a lixivant solution, said lixivant solution extracting copper ions from said ore to produce a lixivant product comprising said lixivant solution in combination with said copper ions, said lixivant product further comprising at least one solid waste material therein;

combining said lixivant product with an organic extractant in a primary containment vessel to generate a mixed liquid product therein comprising a first aqueous phase and a first organic phase, said first organic phase comprising said organic extractant in combination with said copper ions and at least a portion of said solid waste material originally obtained from said lixivant product, and said first aqueous phase comprising said lixivant solution;

separating said first organic phase from said first aqueous phase;

dividing said first organic phase into at lease a primary fraction and a secondary fraction;

delivering said primary fraction of said first organic phase to at least one filtration membrane comprising a plurality of pores therethrough, each of said pores through said filtration membrane having a diameter sufficient to prevent passage of said solid waste material therethrough while allowing passage of said organic extractant, said primary fraction flowing onto said filtration membrane in order to produce a permeate which passes through said filtration membrane and a retentate which does not pass through said filtration membrane, said retentate comprising said solid waste material and said permeate comprising a recovered supply of organic extractant;

transferring said recovered supply of organic extractant to said primary containment vessel for reuse therein in treating subsequent amounts of said lixivant product;

combining said secondary fraction of said first organic phase with an electrolyte solution in a secondary containment vessel to generate a chemical mixture therein comprising a second aqueous phase and a second organic phase, said second aqueous phase comprising said electrolyte solution in combination with said copper ions, and said second organic phase comprising said organic extractant;

separating said second organic phase from said second aqueous phase;

placing said second aqueous phase in contact with an anode and a cathode; and applying electricity to said second aqueous phase, said electricity causing said copper ions within said second aqueous phase to be removed therefrom and plated onto said cathode as metallic copper.

11. The method of claim 10 wherein said filtration membrane is selected from the group consisting of a microfiltration membrane and an ultrafiltration membrane.

12. The method of claim 10 wherein each of said pores through said filtration membrane has a diameter of about 0.001–1.0 microns.

13. The method of claim 10 wherein said permeate passes through said filtration membrane at a membrane flux rate of about 10–30 GFD.

14. The method of claim 10 wherein said filtration membrane further comprises a first end and a second end, and said delivering of said primary fraction of said first organic phase to said filtration membrane comprises supplying said primary fraction to said first end of said filtration membrane so that said primary fraction flows onto said filtration membrane and travels across said filtration membrane from said first end to said second end in order to produce said permeate and said retentate during movement of said primary fraction across said filtration membrane, said retentate leaving said filtration membrane at said second end thereof, said movement of said primary fraction of said first organic phase across said filtration membrane from said first end to said second end preventing cloggage of said pores in said filtration membrane.

15. The method of claim 10 wherein said organic extractant comprises at least one hydroxyphenyl oxime.

16. The method of claim 10 wherein said electrolyte solution comprises sulfuric acid.

17. The method of claim 10 wherein said dividing of said first organic phase into said primary fraction and said secondary fraction comprises removing about 1–10% by weight of said first organic phase as said primary fraction and removing about 90–99% by weight of said first organic phase as said secondary fraction.

18. A method for recovering copper from copper ore comprising the steps of:

providing a supply of copper ore;

placing said copper ore in contact with a lixivant solution, said lixivant solution extracting copper ions from said ore to produce a lixivant product comprising said lixivant solution in combination with said copper ions, said lixivant product further comprising at least one solid waste material therein;

combining said lixivant product with an organic extractant in a primary containment vessel to generate a mixed liquid product therein comprising a first aqueous phase and a first organic phase, said first organic phase comprising said organic extractant in combination with said copper ions and at least a portion of said solid waste material originally obtained from said lixivant product, and said first aqueous phase comprising said lixivant solution;

separating said first organic phase from said first aqueous phase; and delivering at least a portion of said first organic phase to at least one filtration membrane comprising a plurality of pores therethrough, each of said pores through said filtration membrane having a diameter sufficient to prevent passage of said solid waste material therethrough while allowing passage of said organic extractant, said portion of said first organic phase flowing onto said filtration membrane in order to produce a permeate which passes through said filtration membrane and a retentate which does not pass through said filtration membrane, said retentate comprising said solid waste material and said permeate comprising a recovered supply of organic extractant.

19. The method of claim 18 wherein said filtration membrane is selected from the group consisting of a microfiltration membrane and an ultrafiltration membrane.

* * * * *